United States Patent
Agrawal et al.

(10) Patent No.: US 11,583,760 B1
(45) Date of Patent: Feb. 21, 2023

(54) CONTROLLER MODE FOR A MOBILE DEVICE

(71) Applicant: Motorola Mobility LLC, Chicago, IL (US)

(72) Inventors: Amit Kumar Agrawal, Bangalore (IN); Olivier David Meirhaeghe, Lincolnshire, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/397,002

(22) Filed: Aug. 9, 2021

(51) Int. Cl.
  *A63F 13/23* (2014.01)
  *G06F 3/04817* (2022.01)
  *A63F 13/22* (2014.01)
  *A63F 13/2145* (2014.01)
  *G06F 3/04886* (2022.01)

(52) U.S. Cl.
  CPC .......... *A63F 13/23* (2014.09); *A63F 13/2145* (2014.09); *A63F 13/22* (2014.09); *G06F 3/04817* (2013.01); *G06F 3/04886* (2013.01)

(58) Field of Classification Search
  CPC ...... A63F 13/23; A63F 13/2145; A63F 13/22; G06F 3/04817; G06F 3/04886
  See application file for complete search history.

(56) References Cited

U.S. PATENT DOCUMENTS

| | | |
|---|---|---|
| 9,491,374 B1 | 11/2016 | Avrahami et al. |
| 10,147,141 B1 | 12/2018 | Rixford |
| 10,387,098 B2 | 8/2019 | Park et al. |
| 10,531,039 B1 | 1/2020 | Bender et al. |
| 10,554,921 B1 | 2/2020 | Lim et al. |
| 2006/0112349 A1 | 5/2006 | Clow et al. |
| 2007/0101293 A1 | 5/2007 | Cherry et al. |
| 2007/0112926 A1* | 5/2007 | Brett .................... G06Q 10/109 709/206 |
| 2007/0124507 A1 | 5/2007 | Gurram et al. |
| 2008/0250408 A1 | 10/2008 | Tsui et al. |
| 2009/0204881 A1 | 8/2009 | Murthy et al. |
| 2012/0050183 A1* | 3/2012 | Lee ........................ G06F 3/1423 345/3.1 |
| 2012/0226742 A1 | 9/2012 | Momchilov et al. |
| 2014/0006634 A1 | 1/2014 | Eacott et al. |
| 2014/0098038 A1* | 4/2014 | Paek ..................... G06F 1/1692 345/173 |
| 2014/0192137 A1 | 7/2014 | Kim et al. |
| 2014/0277843 A1 | 9/2014 | Langlois et al. |

(Continued)

OTHER PUBLICATIONS

"Non-Final Office Action", U.S. Appl. No. 17/395,405, filed Dec. 27, 2021, 21 pages.

(Continued)

*Primary Examiner* — Daniel Samwel
(74) *Attorney, Agent, or Firm* — FIG. 1 Patents

(57) ABSTRACT

Techniques for a controller mode for a mobile device are described and may be implemented to enable a mobile device to implement a controller mode. In the controller mode a controller graphical user interface is presented on the mobile device and is utilized to receive input to interact with application content communicated from the mobile device to a remote display device. Generally, the described implementations enable multiple controller triggers to be utilized to trigger a controller mode on a mobile device.

20 Claims, 21 Drawing Sheets

(56) References Cited

U.S. PATENT DOCUMENTS

| | | | |
|---|---|---|---|
| 2014/0320398 A1 | 10/2014 | Papstein | |
| 2014/0349757 A1* | 11/2014 | Nogami | A63F 13/53 463/31 |
| 2016/0210011 A1* | 7/2016 | Ho | G06F 9/451 |
| 2016/0283063 A1* | 9/2016 | Missig | G06F 3/1423 |
| 2017/0078428 A1 | 3/2017 | Unter Ecker | |
| 2017/0277498 A1 | 9/2017 | Wood, Jr. et al. | |
| 2019/0156788 A1* | 5/2019 | Lee | G06F 3/1423 |
| 2019/0182113 A1 | 6/2019 | Alam et al. | |
| 2019/0294268 A1 | 9/2019 | Koyama et al. | |
| 2019/0378519 A1 | 12/2019 | Dunjic et al. | |
| 2020/0356243 A1 | 11/2020 | Meyer et al. | |
| 2021/0097208 A1* | 4/2021 | Donahue | G06F 21/84 |
| 2021/0181922 A1 | 6/2021 | Chang et al. | |
| 2021/0248483 A1 | 8/2021 | Tomasik et al. | |
| 2021/0349627 A1 | 11/2021 | Chang et al. | |
| 2022/0070371 A1 | 3/2022 | Bushman et al. | |
| 2022/0070389 A1 | 3/2022 | Tangeland et al. | |

OTHER PUBLICATIONS

Agrawal, Amit Kumar et al., "U.S. Application as Filed", U.S. Appl. No. 17/473,384, filed Sep. 13, 2021, 68 pages.
Agrawal, Amit Kumar et al., "U.S. Application as Filed", U.S. Appl. No. 17/397,002, filed Aug. 9, 2021, 82 pages.
Desai, Rahul B. et al., "U.S. Application as Filed", U.S. Appl. No. 17/462,281, filed Aug. 31, 2021, 57 pages.
Meirhaeghe, Olivier D. et al., "U.S. Application as Filed", U.S. Appl. No. 17/395,405, filed Aug. 5, 2021, 80 pages.
Snow, Jeffrey T. et al., "U.S. Application as Filed", U.S. Appl. No. 17/473,312, filed Sep. 13, 2021, 48 pages.
"Auto Hotspot, How to | Samsung Galaxy S10 Plus", YouTube Video uploaded by Omarr Ghafoor [online][retrieved Jun. 23, 2021]. Retrieved from the Internet <https://www.youtube.com/watch?v=2V6s31zA7p4>., Oct. 30, 2019, 4 Pages.
"Check your phone's notifications in Samsung DeX", Samsung Electronics America, Inc. [retrieved Jul. 16, 2021]. Retrieved from the Internet <https://www.samsung.com/us/support/answer/ANS00062702/>., 2019, 3 Pages.
"Do you know about Auto Hotspot?", Samsung [retrieved Jun. 23, 2021]. Retrieved from the Internet <https://r2.community.samsung.com/t5/Tech-Talk/Do-you-know-about-Auto-Hotspot/td-p/2967111>., Dec. 4, 2019, 5 Pages.
"How do you automatically activate Mobile hotspot via Bluetooth connection on Windows 10 Mobile?", in: Windows Central Forums [online][retrieved Jul. 12, 2021]. Retrieved from the Internet <https://forums.windowscentral.com/ask-question/452584-how-do-you-automatically-activate-mobile-hotspot-via-bluetooth-connection-windows-10-mobile.html>., Feb. 19, 2017, 11 Pages.
"Instant Hotspot on your Mac", Apple Inc. [retrieved Jun. 23, 2021]. Retrieved from the Internet <https://support.apple.com/guide/macbook-air/instant-hotspot-apdae69c81f1/mac>., Feb. 2019, 2 Pages.
"Setting up Auto Hotspot on my Samsung phone", Samsung [retrieved Jun. 23, 2021]. Retrieved from the Internet <https://www.samsung.com/au/support/mobile-devices/setup-auto-hotspot/>., Oct. 20, 2020, 8 Pages.
Pratik , "How to Use Your Phone as a Drawing Pad for PC", TechWiser Blog [online][retrieved Jun. 8, 2021]. Retrieved from the Internet <https://techwiser.com/use-phone-as-drawing-pad-for-pc/>., Jul. 15, 2020, 12 pages.
Bohn, Dieter , "Chromebook Instant Tethering expands beyond Google devices and phones", The Verge Blog, Vox Media, LLC. [online][retrieved Jun. 23, 2021]. Retrieved from the Internet <https://www.theverge.com/2019/2/4/18210378/chromebook-instant-tethering-android-mobile-hotspot-chrome-os-expansion>., Feb. 4, 2019, 6 Pages.
Cipriani, Jason , "How to use Apple's Instant Hotspot feature", CNET [online][retrieved Jun. 23, 2021]. Retrieved from the Internet <https://www.cnet.com/how-to/how-to-use-apples-instant-hotspot-feature/>., Feb. 7, 2019, 4 Pages.
Heinisch, Christian , "HotSpot Automatic (free)", Google Play [retrieved Jul. 12, 2021]. Retrieved from the Internet <https://play.google.com/store/apps/details?id=de.christian_heinisch.hotspot.enablehotspot&hl=en_US&gl=US>., Jun. 7, 2018, 3 Pages.
Russell, Brandon , "Galaxy S21 features wireless support for Samsung DeX on PC", XDA Developers Blog [online][retrieved Jun. 8, 2021]. Retrieved from the Internet <https://www.xda-developers.com/galaxy-s21-wireless-support-samsung-dex-on-pc/>., Feb. 5, 2021, 7 pages.
U.S. Appl. No. 17/395,405, "Final Office Action", U.S. Appl. No. 17/395,405, filed Jun. 22, 2022, 38 pages.
Tappert, Charles C, et al., "Chapter 6—English Language Handwriting Recognition Interfaces", In: Text Entry Systems: Mobility, Accessibility, Universality, Morgan Kaugmann [retrieved Jun. 27, 2022]. Retrieved from the Internet <https://doi.org/10.1016/B978-012373591-1/50006-1>, 2007, pp. 123-137.
U.S. Appl. No. 17/395,405, dated Oct. 28, 2022, "Non-Final Office Action", U.S. Appl. No. 17/395,405, dated Oct. 28, 2022, 39 pages.
U.S. Appl. No. 17/473,384, dated Oct. 6, 2022, "Non-Final Office Action", U.S. Appl. No. 17/473,384, dated Oct. 6, 2022, 14 pages.

* cited by examiner

CONTROLLER MODE FOR A MOBILE DEVICE

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. Many people have access to multiple different devices and use of a particular device depends on the person's current status, such as on the go, in the office, at home, and so forth. While individual instances of devices provide functionality for discrete sets of tasks, the ability for devices to intercommunicate with one another greatly expands available task options and operating environments. For instance, a typical smartphone is able to wirelessly cast visual content to a larger screen device to enable enhanced enjoyment of the content.

In the context of input/output functionality, however, current techniques for device intercommunication are limited. For instance, dedicated devices such as digital drawing pads are available that provide for stylus input to other devices such as desktops and laptops. These devices are expensive however and represent additional devices that a user must manage. Further, some smartphones are able to provide coarse input functionality for other devices, such as serving as remote control devices for smart televisions and/or digital media players. Thus, conventional techniques for device intercommunication provide users for little or no input/output functionality.

BRIEF DESCRIPTION OF THE DRAWINGS

Aspects of input session between devices based on an input trigger and controller mode for a mobile device are described with reference to the following Figures. The same numbers may be used throughout to reference similar features and components that are shown in the Figures.

DETAILED DESCRIPTION

Figure 1:
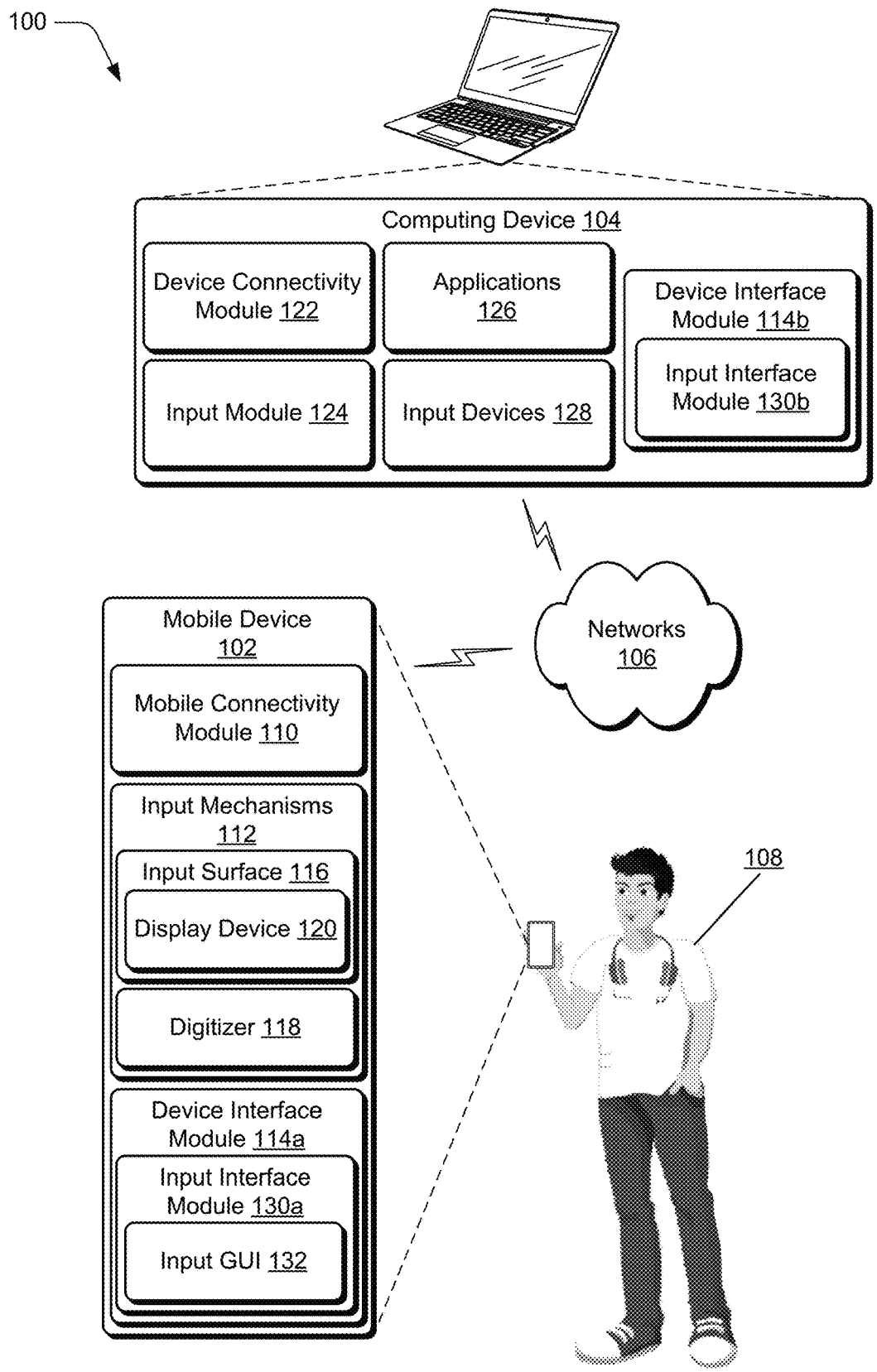
FIG. 1 illustrates an example environment in which aspects of input session between devices based on an input trigger can be implemented.

Techniques for input session between devices based on an input trigger are described and may be implemented to enable a first device (e.g., a mobile device) to serve as an input device for a second device. Generally, the described implementations enable multiple different input triggers to be utilized to trigger an input session between devices, which provides for greater automation and user convenience than is provided by traditional techniques for inter-device communication.

According to various implementations, the described techniques use various input triggers to establish an input session between devices. For instance, consider a scenario where a mobile device (e.g., a smartphone) is in physical proximity to a computing device, e.g., a laptop computer, a desktop computer, etc. The mobile device and the computing device, for example, are able to intercommunicate, such as via wireless and/or wired connectivity. While the mobile device and the computing device are in physical proximity, an input trigger occurs on the computing device indicating that an input session is to be established between the mobile device and the computing device. The input trigger, for instance, represents an event that occurs on the computing device such as a device pairing between the computing device and the mobile device, an application launch, a change in application focus, a focus event for an input field (e.g., an input field within an application graphical user interface), and so forth.

Accordingly, in response to the input trigger, an input session is established between the mobile device and the computing device. The mobile device and the computing device, for example, negotiate a wireless and/or wired input communication channel between the devices. In at least one implementation, the input session is established automatically and in response to the trigger event, e.g., independent of user interaction to initiate establishing the input session. Generally, the mobile device and the wireless device are able to establish interconnectivity for the input session in various ways, such as direct wireless connectivity and/or wired connectivity.

Accordingly, as part of the input session, proximity-based input to the mobile device is communicated to the computing device and utilized as input to the computing device. Generally, "proximity-based input" refers to input to the mobile device that involves proximity to an input surface of the mobile device, such as stylus input, touch input, contactless input (e.g., a stylus and/or user's finger) detected in proximity to an input surface, and so forth. Pursuant to the input session, for example, a user provides proximity-based input to a touchscreen of the mobile device and the proximity-based input is communicated to the computing device and utilized as input. The input is utilizable by the computing device for various purposes, such as populating input characters to a graphical user interface, selecting selectable indicia presented on a display of the computing device, invoking functionality of the computing device, and so forth.

Accordingly, the techniques described herein provide seamless interfacing between devices for input sessions. For instance, in response to various input trigger events, input sessions are established between devices to enable proximity-based input from one device to be communicated to and utilized by a second device.

Techniques for a controller mode for a mobile device are also described and may be implemented to enable a mobile device to implement a controller mode in which a controller graphical user interface is presented on the mobile device and is utilized to receive input to interact with application content communicated from the mobile device to a remote display device. Generally, the described implementations enable multiple controller triggers to be utilized to trigger a controller mode on a mobile device, which provides for greater automation and user convenience than is provided by traditional techniques for inter-device communication.

According to various implementations, the described techniques use various controller triggers to initiate a controller mode on a mobile device. For instance, consider a scenario where an application launches on a mobile device and the application generates application content. The mobile device establishes connectivity (e.g., wireless and/or wired connectivity) with a remote display device and communicates the application content to the remote display device for output. Based on the application launch a controller trigger occurs that causes a controller mode to be activated on the mobile device. In the controller mode a controller graphical user interface is displayed on the mobile device and is able to receive user input to interact with the application content displayed on the remote display device. The application content and the interactions with the application content, for instance, are generated at the mobile device and are communicated to the remote display device for display.

Consider, for example, a scenario where a gaming application is launched on the mobile device. In response to launching the gaming application the mobile device triggers a controller mode in which a game controller graphical user interface is displayed on the mobile device in conjunction with the gaming application generating a game graphical user interface for gameplay. The game graphical user interface is communicated to the remote display device for output and a user is able to interact with the game controller graphical user interface on the mobile device to participate in gameplay as reflected in the game graphical user interface displayed on the remote display device. In at least one implementation the controller mode is launched automatically in response to launch of the gaming application.

In another example application a media player application is launched on a mobile device and in response the mobile device triggers a controller mode in which a media controller graphical user interface is displayed on the mobile device in conjunction with the media player application outputting a media graphical user interface that includes media, e.g., visual media such as movies, television shows, education content. etc. The media graphical user interface is communicated to a remote display device for outputting associated media. A user is able to provide input to the media controller graphical user interface to interact with the media graphical user interface displayed on the remote display device, such as to select instances of media for output, navigate within instances of media, invoke different functionality of the media player application, and so forth.

Accordingly, techniques described herein enable automated invocation of a controller mode on a mobile device in response to various triggering events. A user, for instance, need not provide express input to invoke a controller mode and different system triggers automatically invoke and implement a controller mode. Thus, the techniques described herein provide seamless implementation of controller modes. For instance, in response to various controller trigger events, a controller mode is initiated on a mobile device to enable input to the mobile device to be used to interact with content generated at the mobile device and communicated to a remote display device for display.

While features and concepts of input session between devices based on an input trigger and controller mode for a mobile device can be implemented in any number of environments and/or configurations, aspects the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of input session between devices based on an input trigger can be implemented. The environment 100 includes a mobile device 102 and a computing device 104 that are interconnectable via a network 106. In this particular example, the mobile device 102 represents a portable device that can be carried by a user 108, such as a smartphone or a tablet device. Further, the computing device 104 represents a device such as a laptop computer, a desktop computer, and so forth. These examples are not to be construed as limiting, however, and the mobile device 102 and/or the computing device 104 can be implemented in a variety of different ways and form factors. Example attributes of the mobile device 102 and the computing device 104 are discussed below with reference to the device 2000 of FIG. 20.

The mobile device 102 includes various functionality that enables the mobile device 102 to perform different aspects of input session between devices based on an input trigger discussed herein, including a mobile connectivity module 110, input mechanisms 112, and a device interface module 114a. The mobile connectivity module 110 represents functionality (e.g., logic and hardware) for enabling the mobile device 102 to interconnect with other devices and/or networks, such as the computing device 104 and the network 106. The mobile connectivity module 110, for instance, enables wireless and/or wired connectivity of the mobile device 102.

The input mechanisms 112 represent functionality for enabling input to the mobile device 102, such as user input to invoke functionality of the mobile device 102. The input mechanisms 112, for instance, include an input surface 116 and a digitizer 118. Generally, the input surface 116 represents functionality for receiving proximity-based input to the mobile device 102, such as stylus input, user touch input, contactless input based on proximity of a user's finger and/or a stylus to the mobile device 102, and so forth. The input surface 116, for example, is implemented via a display device 120 of the mobile device 102 that is interconnected with a digitizer 118. For instance, the digitizer 118 receives input to the display device 120 and converts the input into digital signals that are utilized by the mobile device 102 as input signals.

The device interface module 114a represents functionality for enabling the mobile device 102 to interface with other devices. As further detail below, for instance, the device interface module 114a enables the mobile device 102 to establish wireless and/or wired data communication with other devices, e.g., the computing device 104.

The computing device 104 includes various functionality that enables the computing device 104 to perform different aspects of input session between devices based on an input trigger discussed herein, including a device connectivity module 122, an input module 124, applications 126, and a device interface module 114b. The device connectivity module 122 represents functionality (e.g., logic and hardware) for enabling the computing device 104 to interconnect with other devices and/or networks, such as the mobile device 102 and the network 106. The device connectivity module 122, for instance, enables wireless and/or wired connectivity of the computing device 104. Generally, the computing device 104 and the mobile device 102 are configured to intercommunicate via a variety of different wireless protocols, such as wireless cellular (e.g., 3G, 4G, 5G), wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth.

The input module 124 represents functionality for enabling the computing device 104 to receive input to invoke various functionality of the computing device 104. The input module 124, for instance, interfaces with input devices 128 of the computing device 104 for enabling input to the computing device 104. The applications 126 represent functionality for performing different computing tasks via the computing device 104, such as productivity tasks (e.g., word processing, content generation, data analysis, etc.), web browsing, communication with other devices, and so forth. The device interface module 114b is representative of functionality for enabling the computing device 104 to interface with other devices. For instance, the device interface module 114b interfaces with the device interface module 114a of the mobile device 102 to enable collaborative data communication between the computing device 104 and the mobile device 102.

According to implementations for input session between devices based on an input trigger, for example, the device interface module 114a includes an input interface module 130a that interfaces with an input interface module 130b of the device interface module 114b to enable the mobile device 102 to be utilized as an input device for the computing device 104. For instance, and as detailed below, user input to the input surface 116 is communicated via the input interface module 130a to the input interface module 130b and utilized for providing input to the computing device 104. The input interface module 130a, for example, exposes an input graphical user interface (GUI) 132 that is displayed on the display device 120 and that enables the computing device 104 to receive input via the input surface 116 of the mobile device 102.

Having discussed an example environment in which the disclosed techniques can be performed, consider now some example scenarios and implementation details for implementing the disclosed techniques.

Figure 2A:
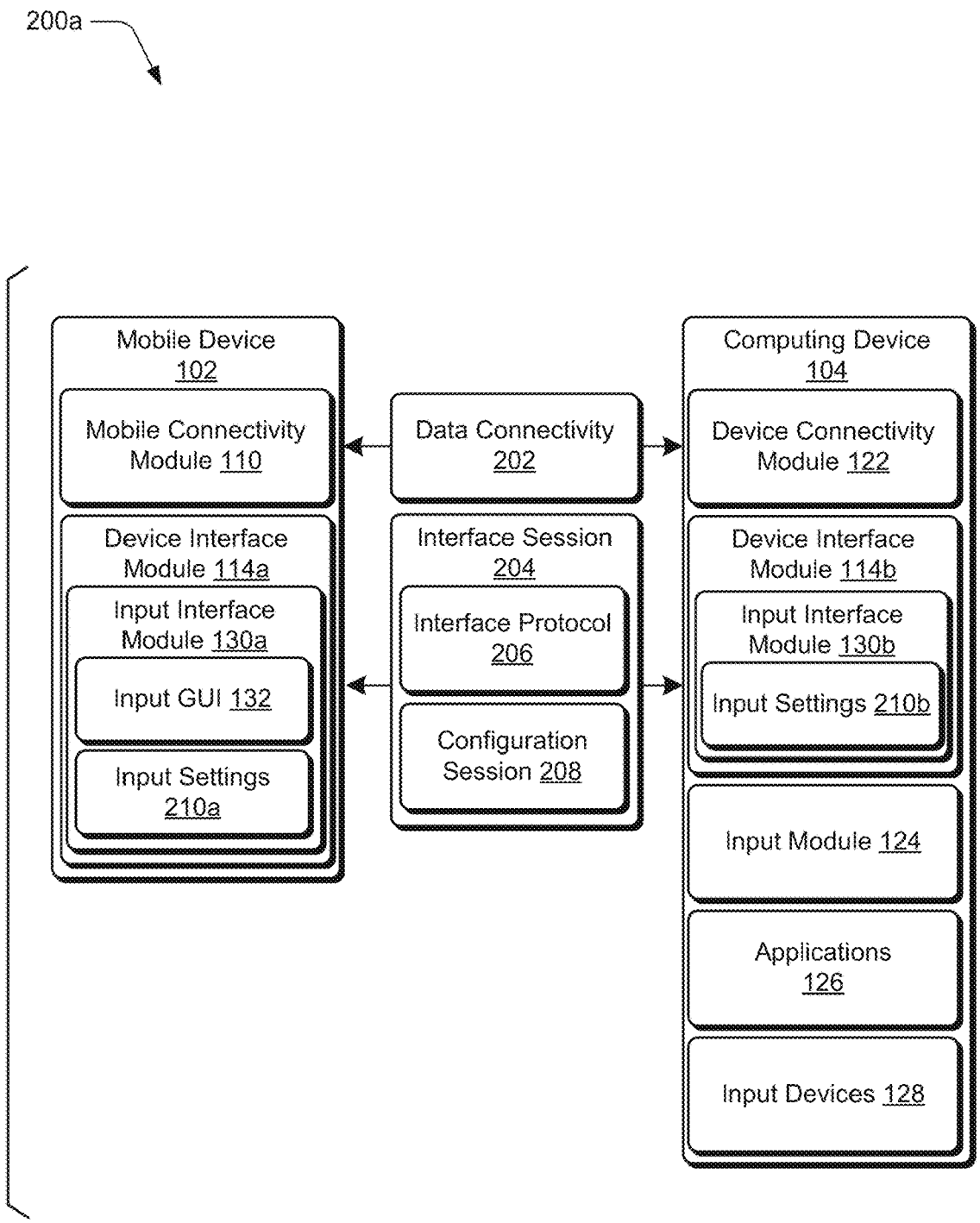
FIG. 2a depicts an example system for implementing a configuration session between devices in accordance with one or more implementations.

FIG. 2a depicts an example system 200a for implementing a configuration session between devices in accordance with one or more implementations. Generally, the system 200a can be implemented in the environment 100 and incorporates attributes of the environment 100 introduced above.

In the system 200a the mobile connectivity module 110 and the device connectivity module 122 interface to establish data connectivity 202 between the mobile device 102 and the computing device 104. Generally, the data connectivity 202 is implemented via wireless and/or wired connectivity between the mobile device 102 and the computing device 104 for exchanging data between the devices. The data connectivity 202, for instance, is implemented via direct wireless and/or wired connectivity between the mobile device 102 and the computing device 104, and/or via data communication over the network 106 between the mobile device 102 and the computing device 104. In a wireless scenario the data connectivity 202 can be established as direct device-to-device connectivity between the mobile device 102 and the computing device 104 and utilizing any suitable wireless protocol, such as Wi-Fi Direct, Bluetooth™ (including Bluetooth™ Low Energy (BLE), ultra-wideband (UWB), Near Field Communication (NFC)), LTE direct, NR sidelink, and so forth.

Utilizing the data connectivity 202 the device interface module 114a of the mobile device 102 and the device interface module 114b of the computing device 104 intercommunicate to establish an interface session 204. Generally, the interface session 204 represents an exchange of data between the device interface modules 114a, 114b and is implemented according to an interface protocol 206. The interface protocol 206, for example, specifies a form in which data is to be communicated as part of the interface session 204. Utilizing the interface session 204 and the interface protocol 206, the input interface module 130a and the input interface module 130b perform a configuration session 208 for configuring input settings 210a of the input interface module 130a and input settings 210b of the input interface module 130b. In at least one implementation, the configuration session 208 is triggered in response to determining that the computing device 104 does not include an input surface for receiving proximity-based input, e.g., stylus and/or touch input. As part of the interface session 204, for example, the device interface module 114a queries the device interface module 114b to determine input functionality of the computing device 104. The device interface module 114b determines that the computing device 104 does not include stylus and/or touch input functionality, such as via a query to the input module 124 for capabilities of the input devices 128. Alternatively or additionally, the configuration session 208 is initiated in response to other triggering events, such as initiation of the interface session 204, user input to initiate the configuration session 208, and so forth.

Generally, the input settings 210*a*, 210*b* specify ways in which the mobile device 102 provides input to the computing device 104. For instance, based on the input settings 210*a*, 210*b*, the input interface module 130*a* utilizes input to the input surface 116 of the mobile device 102 to provide input to the computing device 104. In at least one implementation, the input settings 210*a*, 210*b* are based on specific instances of the applications 126, such as applications 126 that utilize input generated via user interaction with the input surface 116. The input settings 210*a*, 210*b* are configurable in various ways, such as via user interaction with the mobile device 102 and/or the computing device 104, automatically based on system settings of the mobile device 102 and/or the computing device 104 (e.g., settings of the input interface modules 130*a*, 130*b*124), based on settings of instances of the applications 126, and so forth.

Figure 2B:
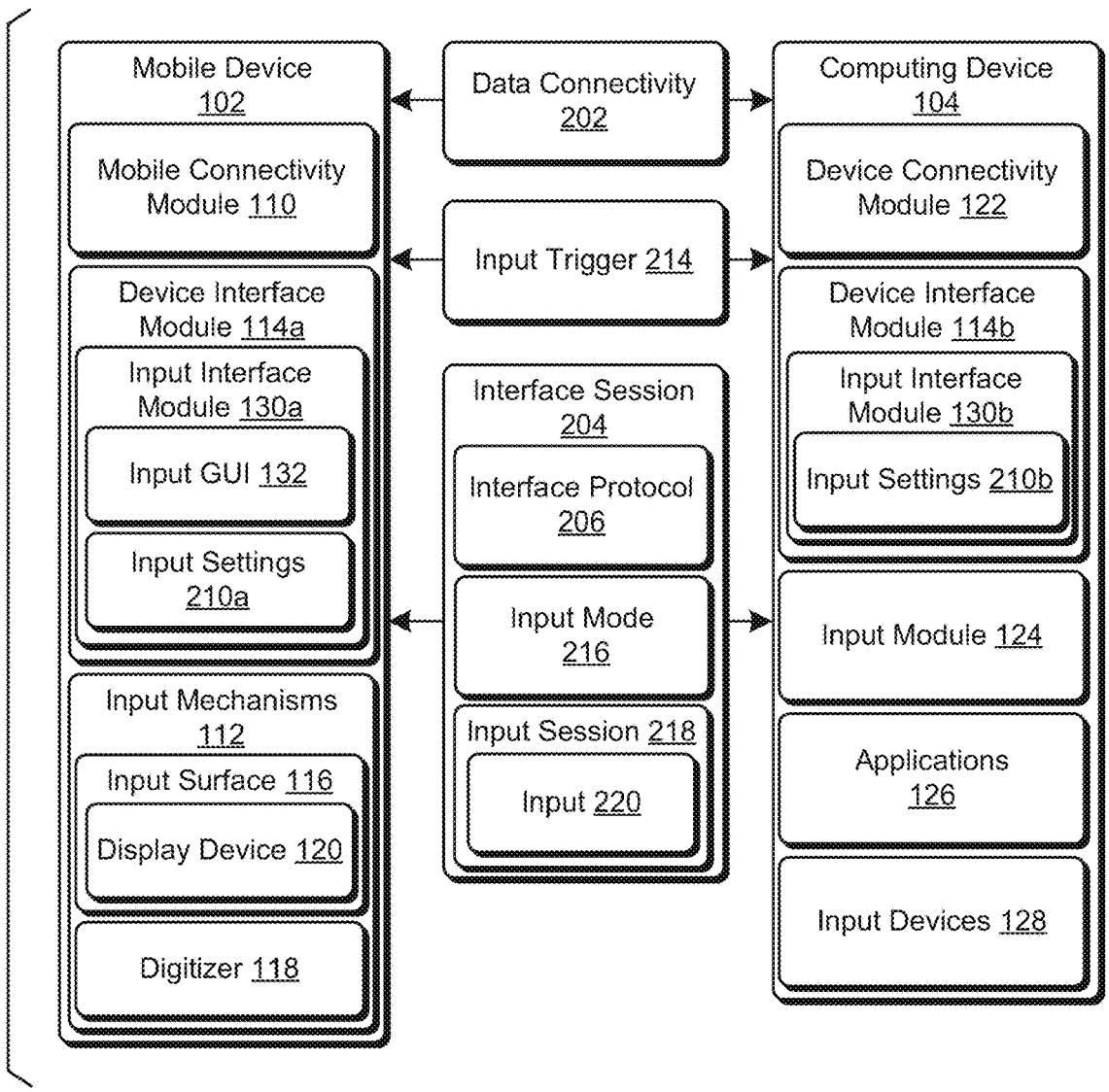
FIG. 2b depicts an example system for implementing an input session between devices based on an input trigger in accordance with one or more implementations.

FIG. 2*b* depicts an example system 200*b* for implementing an input session between devices based on an input trigger in accordance with one or more implementations. Generally, the system 200*b* can be implemented in the environment 100 and incorporates attributes of the environment 100 introduced above. The system 200*b*, for example, represents an extension and/or continuation of the system 200*a*.

In the system 200*b* data connectivity 202 and an interface session 204 are established between the mobile device 102 and the computing device 104, such as described above with reference to the system 200*a*. Further, an input trigger 214 occurs indicating that the computing device 104 is to receive input from the input surface 116 of the mobile device 102. Accordingly, an input mode 216 is triggered and an input session 218 is initiated between the mobile device 102 and the computing device 104 in response to the input mode 216. Generally, the input mode 216 represents an initiation of input exchange between the mobile device 102 and the computing device 104. The input settings 210, for example, specify various input triggers 214 that trigger an input session 218, such as user input to invoke an input session 218, launching an application 126 that invokes an input session 218, an application event indicating that proximity-based input is to be received, establishing the interface session 204, and so forth. As part of the input session 218, input 220 is communicated from the mobile device 102 to the computing device 104. The input 220, for example, is based on user proximity-based input to the input surface 116 and is communicated from the input interface module 130*a* to the input interface module 130*b*. The input module 124 of the computing device 104 receives the input 220 and utilizes the input 220 for various purposes such as for providing input to instances of the applications 126. As part of the input session 218, for example, the input interface module 130*a* causes the input GUI 132 to be displayed on the mobile device 102 for receiving the input 220 to the input surface 116. Accordingly, a user provides the input 220 to the input surface 116 and the input 220 is communicated to the computing device 104 via the input session 218.

Figure 3:
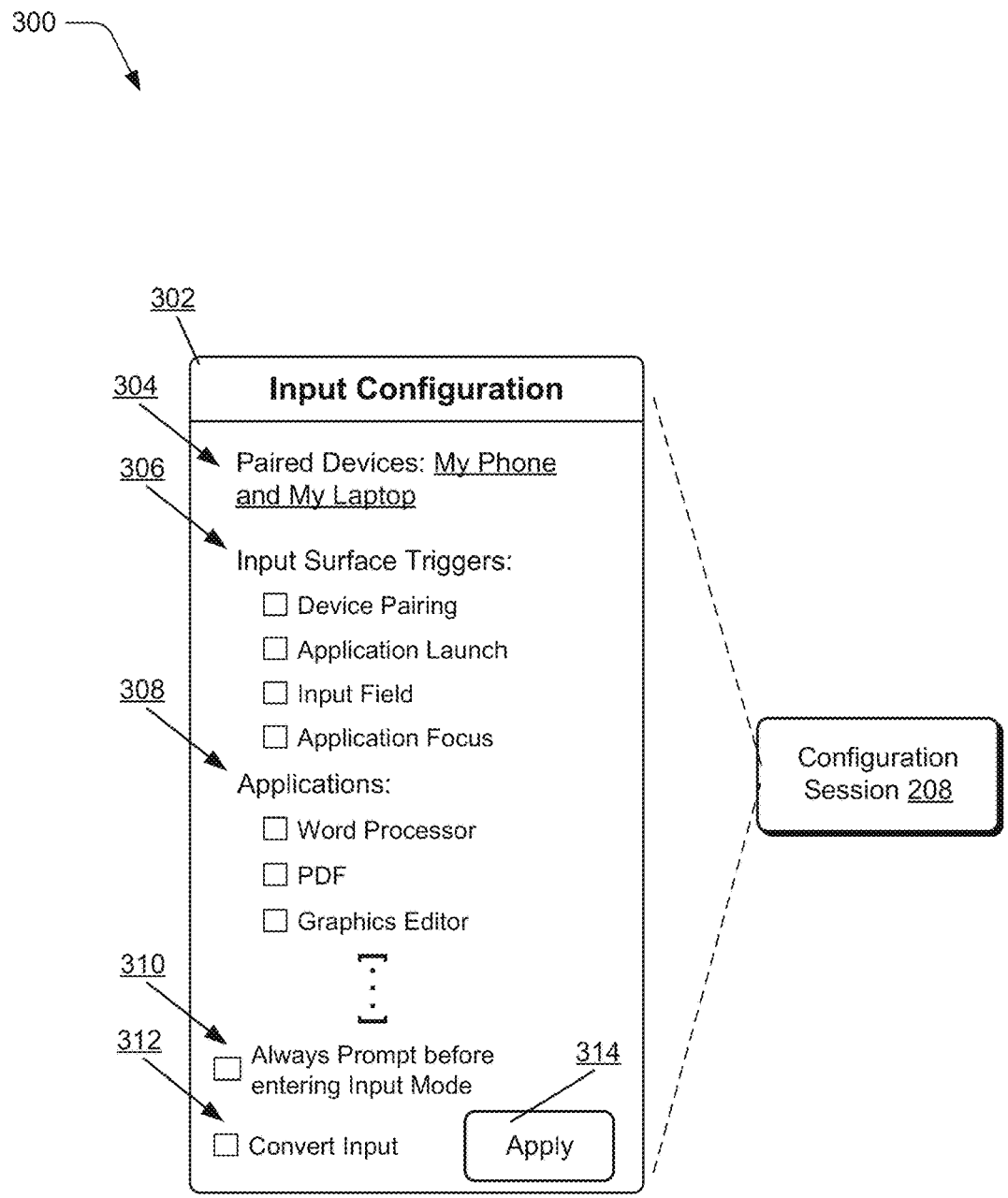
FIG. 3 depicts a scenario for configuring an input mode in accordance with one or more implementations.

FIG. 3 depicts a scenario 300 for configuring an input mode in accordance with one or more implementations. The scenario 300, for example, is implemented as part of the configuration session 208 described above with reference to the system 200*a*. The scenario 300 illustrates a configuration GUI 302 which is presented to enable configuration of an input mode. The configuration GUI 302, for example, is displayed on the mobile device 102 to enable input mode configuration via interaction with the mobile device 102, and/or is displayed on the computing device 104 to enable input mode configuration via interaction with the computing device 104.

The configuration GUI 302 includes a device field 304 that identifies a set of devices for which an input mode is to be configured. The device field 304, for instance, is populated with device names for devices that are paired as part of an interface session such as described above. The configuration GUI 302 also includes a trigger field 306 and an applications field 308. The trigger field 306 enables selection of different trigger events that cause the mobile device 102 to enter an input mode. For instance, "Device Pairing" represents an event where the identified devices pair to one another, such as via wireless and/or wired connectivity. One example of Device Pairing is an interface session 204 such as described above. "Application Launch" represents a launch of an application such as on the computing device 104. "Input Field" represents the presence of a field configured to receive input, such as in an instance of an application 126. "Application Focus" represents an event where a particular application (e.g., Application GUI) comes into focus, such as on a display device of the computing device 104. Generally, each of the triggers identified in the trigger field 306 are selectable to enable or disable a particular type of trigger event.

The applications field 308 lists different types and/or instances of applications 126 that are selectable to identify an application launch for an input mode trigger event. For instance, in conjunction with selecting "Application Launch" from the trigger field 306 a user selects an application or set of applications from the applications field 308 to be utilized as a trigger event for an input mode when an identified application is launched. Alternatively or additionally, in conjunction with selecting "Application Focus" from the trigger field 306 a user selects an application or set of applications from the applications field 308 to be utilized as a trigger event for an input mode when an identified application is brought into focus.

The configuration GUI 302 further includes a prompt field 310, a convert field 312, and an apply control 314. The prompt field 310 is selectable to enable or disable a user prompt before a device enters an input mode. For instance, if the prompt field 310 is selected and enabled and a trigger event occurs, a user prompt is presented in conjunction with and/or before transitioning to an input mode. However, if the prompt field 310 is not selected and enabled, an automatic transition to an input mode occurs in response to a trigger event, e.g., without a user prompt. The convert field 312 is selectable to cause input to the mobile device 102 to be converted to machine-encoded characters when communicated to the computing device 104 as part of an input session. For instance, as part of an input session, a user applies freehand input to the input surface 116. Accordingly, the freehand input is convertible into machine-encoded characters such based on user selection of the convert field 312. The apply control 314 is selectable to apply the configuration settings from the configuration GUI 302, e.g., to configure input settings 210 of the input interface modules 130.

Figure 4:
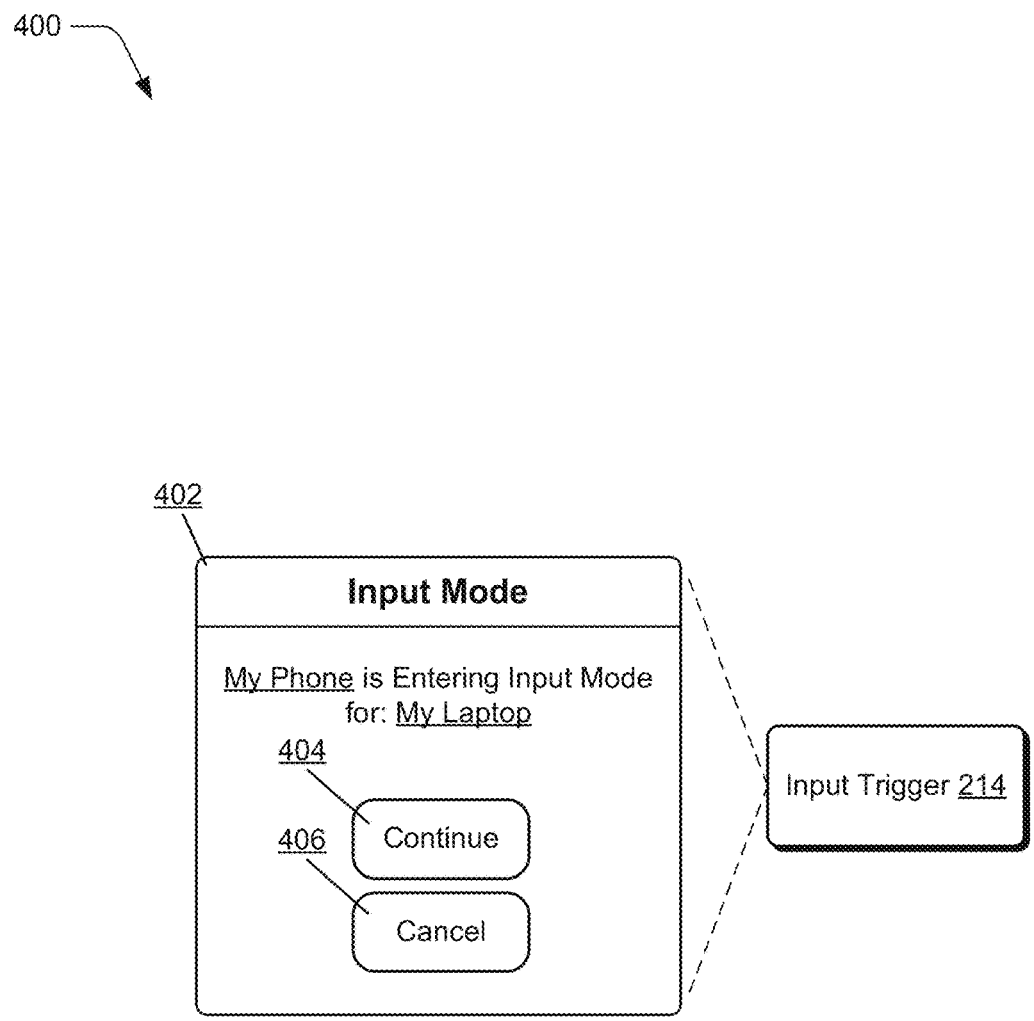
FIG. 4 depicts a scenario for a user prompt in conjunction with transitioning to an input mode in accordance with one or more implementations.

FIG. 4 depicts a scenario 400 for a user prompt in conjunction with transitioning to an input mode in accordance with one or more implementations. The scenario 400, for example, is implemented in response to an input trigger 214 and in conjunction with transitioning to an input session 218 described above with reference to the system 200*b*. The scenario 400 illustrates a user prompt 402 which represents a visual prompt that a transition to an input mode is triggered. The user prompt 402 notifies a user that a device is entering an input mode and identifies devices involved in the input mode transition, e.g., the mobile device 102 and the computing device 104. Further, the user prompt 402 includes a continue control 404 and a cancel control 406. The continue control 404, for instance, is selectable to cause the transition to the input mode to continue. For example, selecting the continue control 404 causes the user prompt 402 to be removed from display and the identified devices to transition to the input mode. In at least one implementation, in conjunction with transitioning to an input mode, the user prompt 402 is presented for a specified period of time, e.g., n seconds. After this period of time, the user prompt 402 is removed and the devices transition to the input mode. Accordingly, the continue control 404 is selectable before this period of time elapses to cause the user prompt 402 to be removed prior to expiry of the period of time and a transition to an input mode to proceed.

The cancel control 406 is selectable to cancel a transition to an input mode. For instance, when an input mode trigger occurs and the user prompt 402 is presented, a user is able to select the cancel control 406 to stop the transition to an input mode. As mentioned above the user prompt 402 is presentable for a specified period of time before transitioning to an input mode. Thus, the cancel control 406 is selectable during this period of time to cancel a transition to an input mode and if the cancel control 406 is not selected during the time that the user prompt 402 is presented, the user prompt 402 is removed and a transition to an input mode proceeds.

Figure 5:
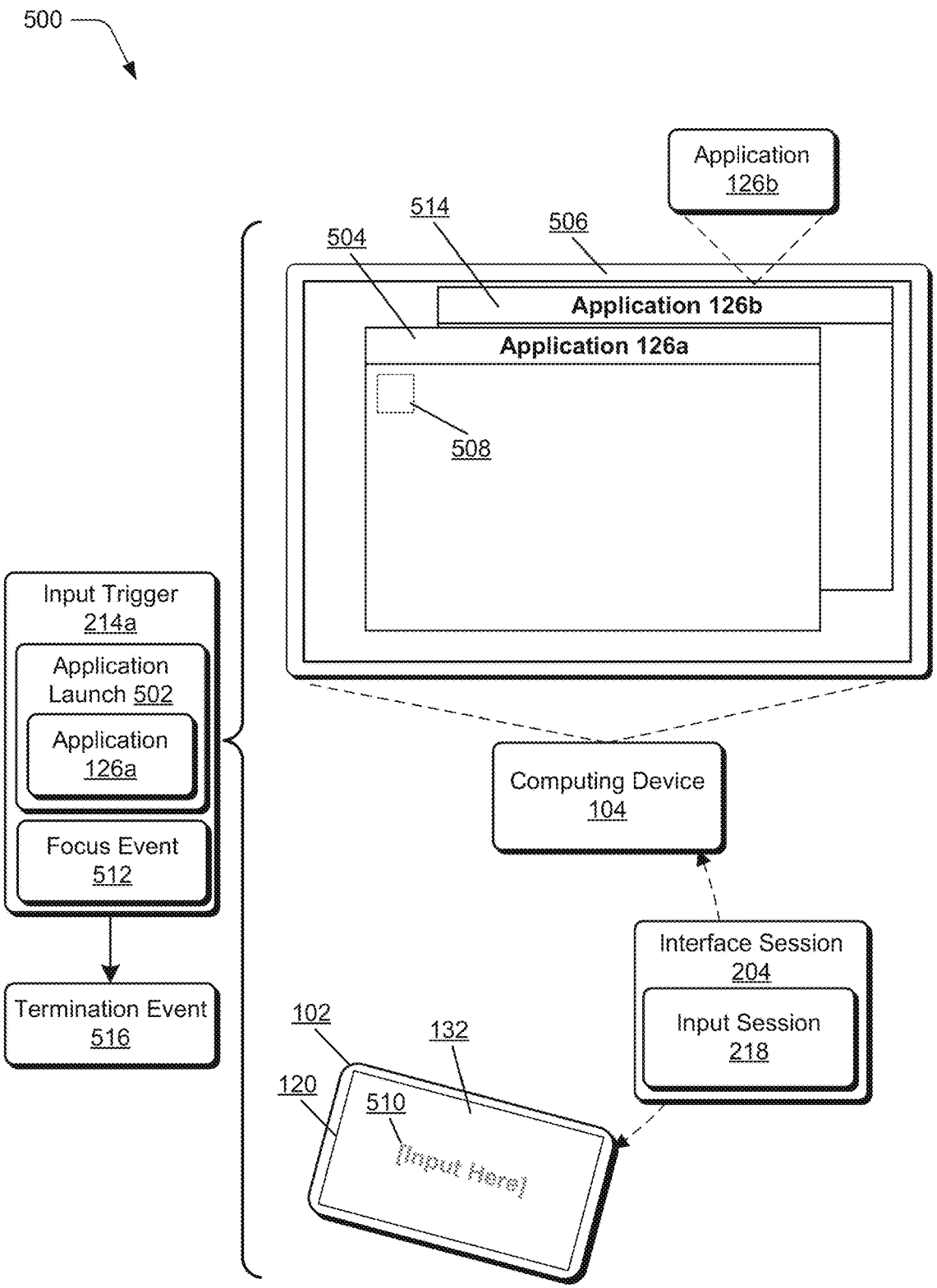
FIG. 5 depicts a scenario for enabling user input in conjunction with an input mode in accordance with one or more implementations.

FIG. 5 depicts a scenario 500 for enabling user input in conjunction with an input mode in accordance with one or more implementations. The scenario 500, for example, is implemented as part of an input session 218. In the scenario 500 an input trigger 214a occurs and an input session 218 is initiated between the mobile device 102 and the computing device 104, such as described above. In this particular example, the input trigger 214a occurs in response to an application launch 502 of an application 126a, which represents an instance of an input trigger 214. A user, for instance, interacts with the computing device 104 to launch the application 126a, which causes the input trigger 214a and an automatic initiation of the input session 218 between the computing device 104 and the mobile device 102. As part of the application launch 502, an application GUI 504 for the application 126a is displayed on a display device 506 of the computing device and the input GUI 132 is displayed on the display device 120 of the mobile device 102.

The application GUI 504 includes an input prompt 508 that identifies a region of the application GUI 504 to which input from the mobile device 102 will be populated. For instance, a user is able to provide input to any portion of the input GUI 132 and the input will be populated to the application GUI 504 beginning at the input prompt 508. In this particular example the input GUI 132 includes an input notification 510 indicating that the input GUI 132 is ready to receive input to provide input to the computing device 104, e.g., for the application GUI 504.

As an alternative or additional implementation of the scenario 500, the input trigger 214a is based on a focus event 512 that occurs indicating a change in application focus from an application 126b to the application 126a. For instance, prior to the input trigger 214a, both of the applications 126a, 126b are executing on the computing device 104 and an application GUI 514 of the application 126b is in focus on the computing device 104, e.g., is displayed in the foreground of the display device 506 and/or is receiving user interaction. In this particular example, the application 126b does not trigger an input session between the mobile device 102 and the computing device 104. The focus event 512 then occurs indicating a change in focus from the application 126b to the application 126a. A user, for instance, provides input to bring the application 126a into focus, such as input to select the application GUI 504 to bring the application GUI 504 into a foreground on the display device 506. Accordingly, in this example the focus event 512 causes the input trigger 214a causing the input session 218 to be initiated, such as described above. In at least one implementation, closing the application 126a and/ or switching focus back to the application 126b triggers a termination event 516 which causes the input session 218 to be automatically terminated. Thus, the described techniques enable dynamic initiation and termination of input sessions between devices.

Figure 6:
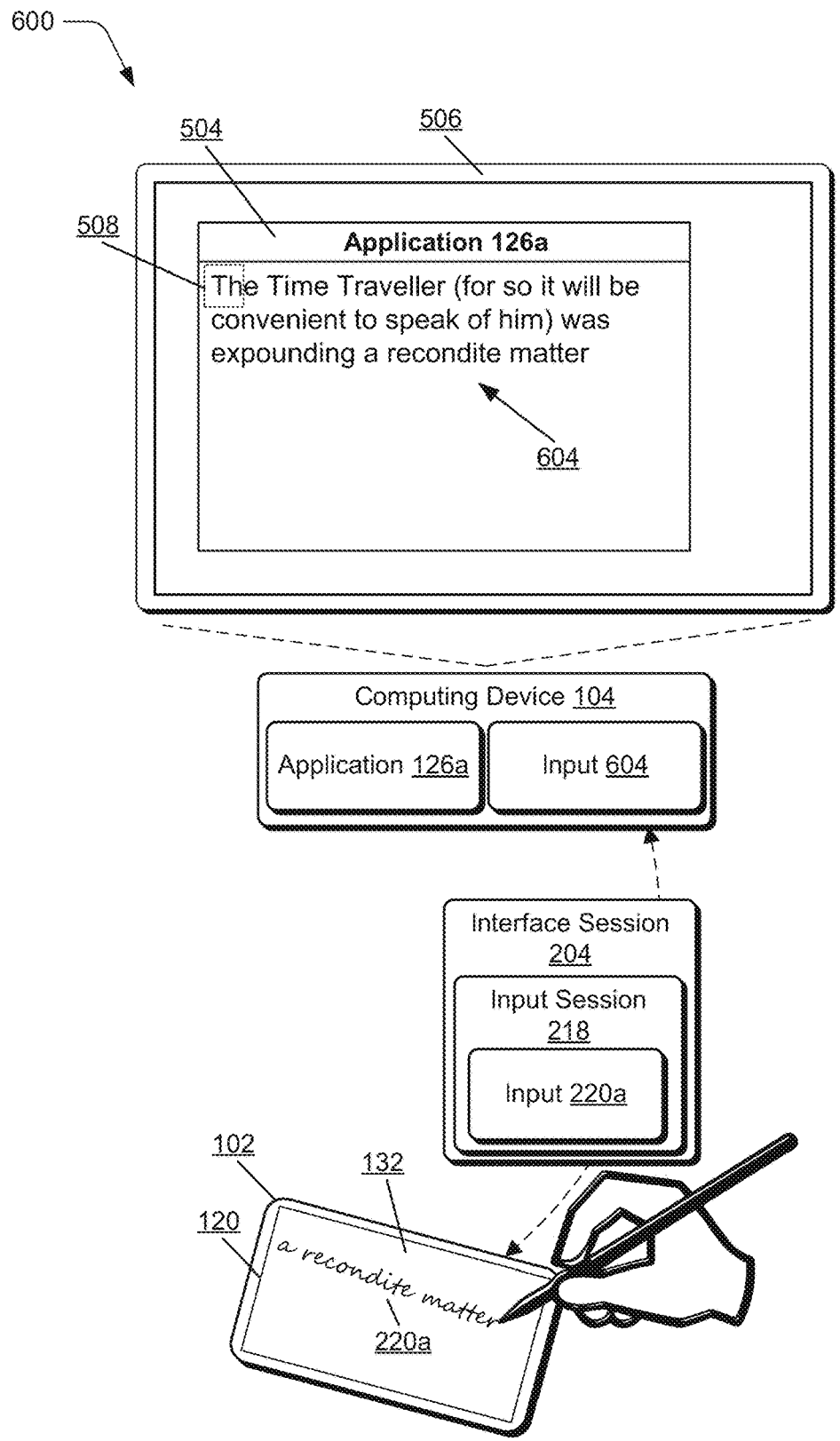
FIG. 6 depicts a scenario for receiving user input in conjunction with an input mode in accordance with one or more implementations.

FIG. 6 depicts a scenario 600 for receiving user input in conjunction with an input mode in accordance with one or more implementations. The scenario 600, for example, is implemented as part of an input session 218 and represents a continuation of the scenarios 400, 500. In the scenario 600 and as part of the input session 218, a user provides input 220a to the input GUI 132 and the input 220a is propagated to the computing device 104 and populated to the application GUI 504 as input 604. In at least one implementation, the input 604 is populated to the application GUI 504 starting at the input prompt 508 and proceeds positionally within the application GUI 504, such as according to content formatting settings (e.g., margins, line spacing, paragraph alignment, etc.) for the application 126a.

Generally, the input 604 is populatable to the application GUI 504 in various ways. For instance, the input 220a is converted by an input interface module 130 into machine-encoded characters, such as via character recognition from freehand input 220a into machine-encoded characters for the input 604. Alternatively, the input 220a is populated as the input 604 to visually simulate the freehand input 220a. Generally, whether the input 220a is converted to machine-encoded characters or visually simulates the input 220a is configurable via the input settings 210. Alternatively or additionally, a decision to convert freehand input to machine-encoded characters is applicable based on application-specific settings for the application 126a receiving the input 220a. For instance, different applications 126 are configurable to include different configuration settings that specify whether freehand input received from the mobile device 102 is converted to machine-encoded characters or is maintained to visually simulate the freehand input.

Further, whether the input 220a is displayed on the input GUI 132 is configurable based on system settings. For instance, freehand input to generate the input 220a is displayed within the input GUI 132. In such a scenario, when a freehand input stroke is applied for the input 220a, the freehand stroke can be displayed within the input GUI 132 for a period of time (e.g., n' seconds) and then removed from display. Alternatively, the input 220a is not displayed on the input GUI 132 while the input 220a is received to the input GUI 132.

Figure 7:
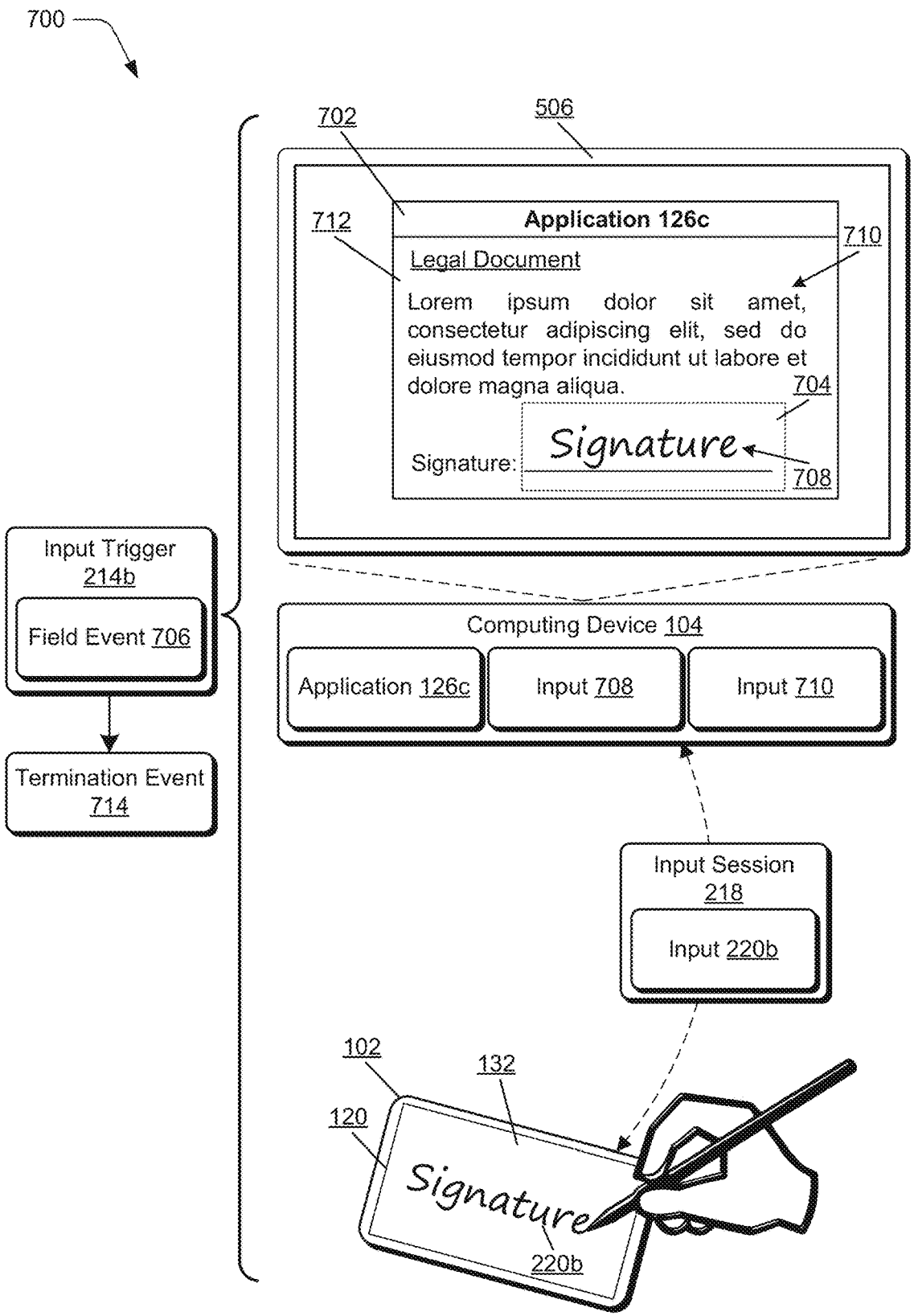
FIG. 7 depicts a scenario for receiving user input in conjunction with an input mode in accordance with one or more implementations.

FIG. 7 depicts a scenario 700 for receiving user input in conjunction with an input mode in accordance with one or more implementations. The scenario 700, for example, is implemented as part of an input session 218 and represents an alternative or additional implementation of the scenarios 500, 600. In the scenario 700 an application GUI 702 for an application 126c is displayed on the display device 506 of the computing device 104. Further, input focus is applied to an input field 704 on the application GUI 702. Input focus, for instance, refers to a portion of the application GUI 702 (e.g., the input field 704) that will be populated based on the input session 218. Generally, input focus is applicable to the input field 704 in various ways, such as via user selection of the input field 704, automatic implementation of focus on the input field 704 (e.g., by the application 126*c*), and so forth.

Accordingly, based on input focus being applied to the input field 704, a field event 706 occurs which triggers an input trigger 214*b* to cause an input session 218 to be established between the mobile device 102 and the computing device 104. For instance, the application 126*c* is launchable without triggering the input session 218. However, when the field event 706 occurs based on input focus placed on the input field 704, this triggers an automatic launch of the input session 218. In at least one implementation this is based on an input setting 210 that indicates that when a particular input field is in focus, an input session is to be triggered. For instance, as part of a configuration session 208, the "Input Field" option from the trigger field 306 of the configuration GUI 302 is enabled. Generally, placing input focus on the input field 704 is able to generate the input trigger 214*b* and initiate the input session 218 in various ways, such as based on metadata for the input field 704 that specifies that the input field 704 is able to receive touch and/or stylus input.

Further to the scenario 700, a user applies freehand input 220*b* to the input GUI 132 displayed on the display device 120 of the mobile device 102. Accordingly, the input 220*b* is populated to the input field 704 as input 708. In this particular example, the input 708 visually simulates the freehand input 220*b*. The input 220*b*, for instance, is not converted into machine-encoded characters, but is propagated to the input field 704 as a digital image that visually simulates the input 220*b*.

As an alternative or additional implementation of the scenario 700, input to the mobile device 102 is utilized to generate the input 708 as well as input 710 within the application GUI 702. For instance, when input focus is placed within the application GUI 702 in a region 712 outside of the input field 704, the input 220*b* is converted into machine-encoded characters and populated as the input 710 to the region 712 of the application GUI 702. However, when input focus is placed on the input field 704 (e.g., based on user selection of the input field 704), the input 220*b* is populated as the input 708 to the input field 704 and that visually simulates the freehand input 220*b*, e.g., the input 220*b* is not converted into machine-encoded characters. Thus, input provided to the input GUI 132 as part of the input session 218 can be populated to the application GUI 702 in different ways, such as based on which region of the application GUI 702 is being populated based on the input 220*b*.

In at least one implementation, removing focus from the input field 704 and/closing the application 126*c* causes a termination event 714 which causes the input session 218 to be terminated. For instance, a user selects a region of the application GUI 702 outside of the input field 704 which causes input focus to be removed from the input field 704 and thus the termination event 714 for terminating the input session 218. Alternatively or additionally, closing the application 126*c* causes the termination event 714.

Figure 8:
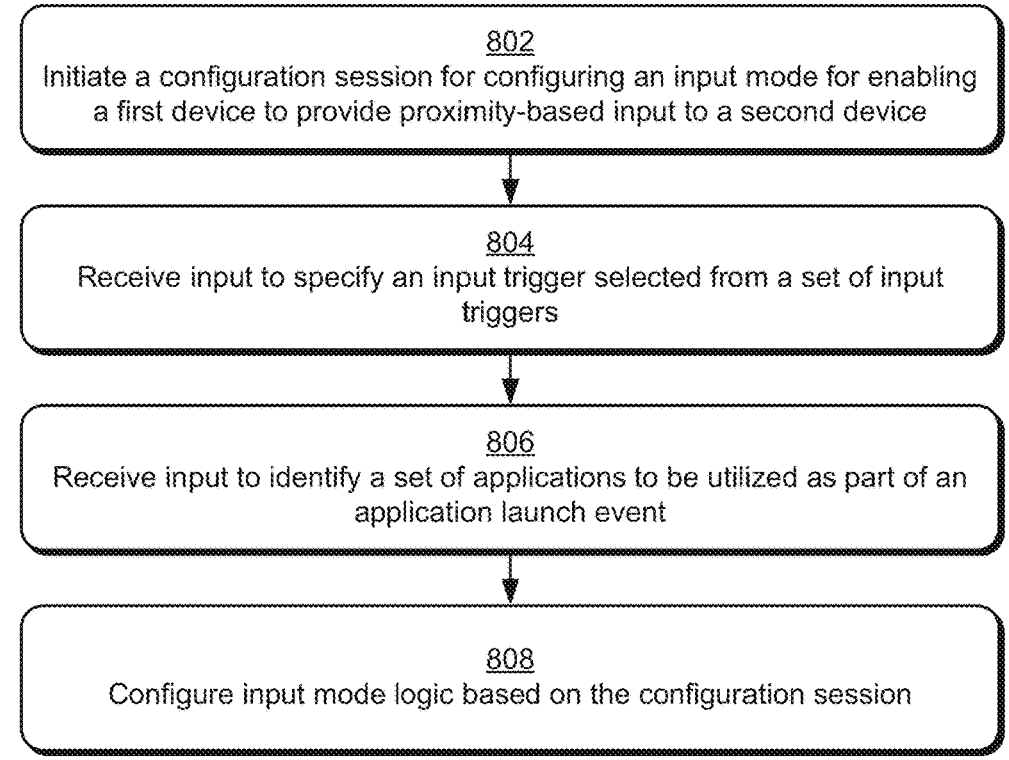
FIG. 8 illustrates an example method for configuring input mode logic for input sessions in accordance with one or more implementations.

FIG. 8 illustrates an example method 800 for configuring input mode logic for input sessions in accordance with one or more implementations. At 802 a configuration session is initiated for configuring an input mode for enabling a first device to provide proximity-based input to a second device. A user, for instance, interacts with the mobile device 102 and/or the computing device 104 to initiate configuration of input mode logic, such as for configuring the input settings 210*a*, 210*b*. Alternatively or additionally, a configuration session is automatically initiated by the input interface module 130*a* and/or 130*b*, such as in response to a pairing event indicating that an interface session 204 is established between the mobile device 102 and the computing device 104. In at least one implementation, as part of initiating the configuration session, a user interface is presented that enables user input to specify parameters for input sessions, such as the configuration GUI 302 discussed above.

At 804, as part of the configuration session, input is received to specify an input trigger selected from a set of input triggers. Examples of different input triggers are described above, such as an application launch event, an input field focus event, a change in application focus event, a device pairing event, and so forth. At 806, as part of the configuration session, input is received to identify a set of applications to be utilized as part of an application launch event. For instance, in a scenario where an application launch event is selected as an input trigger, a user is able to select an instance of an application and/or set of applications to be utilized for an application launch event.

At 808 based on the configuration session, input mode logic of the first device and/or the second device is configured to enable an input session to be established between the first device and the second device according to the input mode logic. For instance, input settings 210*a*, 210*b* of the input interface module 130*a* and/or the input interface module 130*b* are configured based on the configuration session to specify trigger events that trigger an input session as well as other input session-related behaviors. Accordingly, an input session is able to be initiated and managed based on the configured input mode logic.

Figure 9:
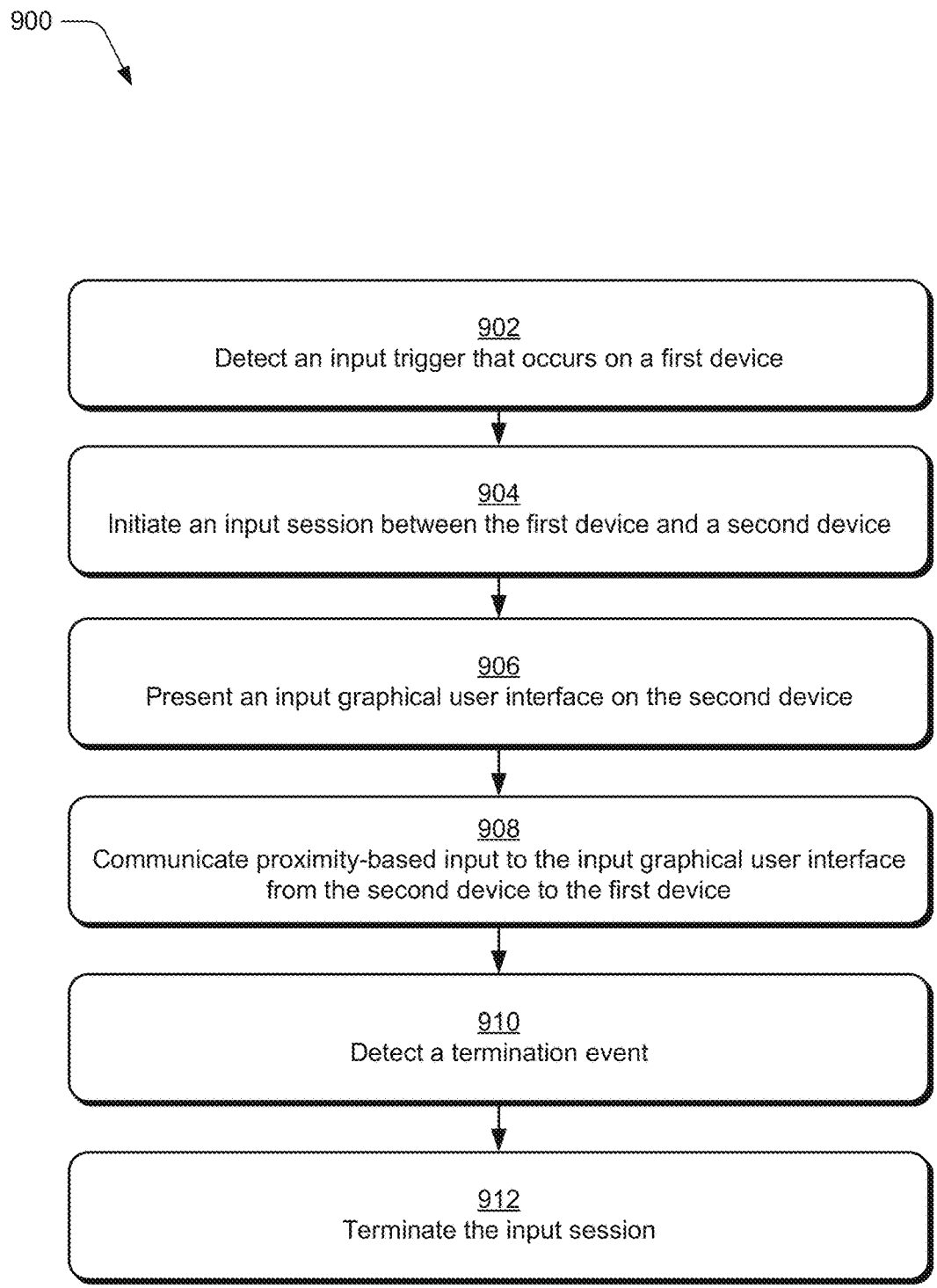
FIG. 9 illustrates an example method for implementing an input session in accordance with one or more implementations.

FIG. 9 illustrates an example method 900 for implementing an input session in accordance with one or more implementations. The method 900, for instance, occurs in conjunction with (e.g., subsequently to) a configuration session for configuring input mode logic, such as described above. At 902 an input trigger that occurs on a first device is detected. Examples of different input triggers are described above, such as an application launch on the first device, a change in application focus on the first device, that an input field displayed on the first device is in input focus on the first device, a device pairing event between the first device and a second device, and so forth. In at least one implementation the input trigger is detected in conjunction with (e.g., subsequently to) an interface session being established between the first device and a second device, e.g., between the computing device 104 and the mobile device 102.

At 904 in response to the input trigger, an input session is initiated between the first device and a second device. The input interface modules 130*a*, 130*b*, for instance, intercommunicate to establish an input session between the mobile device 102 and the computing device 104. Generally, the input session enables input to the mobile device 102 to be communicated to the computing device 104, such as detailed above. At 906, in response to initiation of the input session, an input graphical user interface is presented on the second device. For instance, automatically and in response to initiation of the input session, an input GUI 132 is presented on the mobile device 102. In at least one implementation, the input GUI 132 encompasses an entire region of the display device 120 of the mobile device 102 and is able to receive proximity-based input for communication to the computing device 104 as part of the input session.

As described previously, in conjunction with initiating an input session, a user prompt 402 can be presented on the mobile device 102 and/or the computing device 104 that notifies a user that an input session is being initiated. A user is able to interact with the user prompt to cause the input session to proceed or to cancel initiation of the input session. In at least one implementation the user prompt 402 is automatically removed after a period of time, e.g., if a user does not interact with the user prompt 402.

At 908 proximity-based input to the input graphical user interface is communicated from the second device to the first device. Different examples of proximity-based input are discussed above an include stylus input and/or touch input. The proximity-based input to the second device, for instance, is communicated to the first device and populated to an application graphical user interface, an input field, and/or other input-receiving functionality of the second device.

Generally, the input communicated from the first device to the second device is processable in different ways. For instance, the input represents freehand input to the mobile device 102 and is converted into machine-encoded characters (e.g., ASCII-based characters) before being populated to the computing device 104. Alternatively or additionally, at least some portions of the freehand input are populated to the computing device 104 as a visual simulation of the freehand input. As detailed previously, a decision whether the input is converted into machine-encoded characters or visually simulates the freehand input depends on various parameters, such as input mode logic configured during input mode configuration, application settings for an application receiving the input, input field settings for an input field receiving the input, and so forth.

At 910 a termination event is detected. Generally, the termination event indicates that the input session is to be terminated. Examples of different termination events include an application that triggered the input session being closed on the first device, a change in application focus on the first device, an input field that triggered the input session being no longer in focus on the first device, user input to instruct that the input session be terminated, a power off event for the mobile device 102 and/or the computing device 104, and so forth.

At 912 the input session is terminated. For instance, in response to the termination event, the input session between the computing device 104 and the mobile device 102 is terminated and the input GUI 132 is removed from the mobile device 102.

Figure 10:
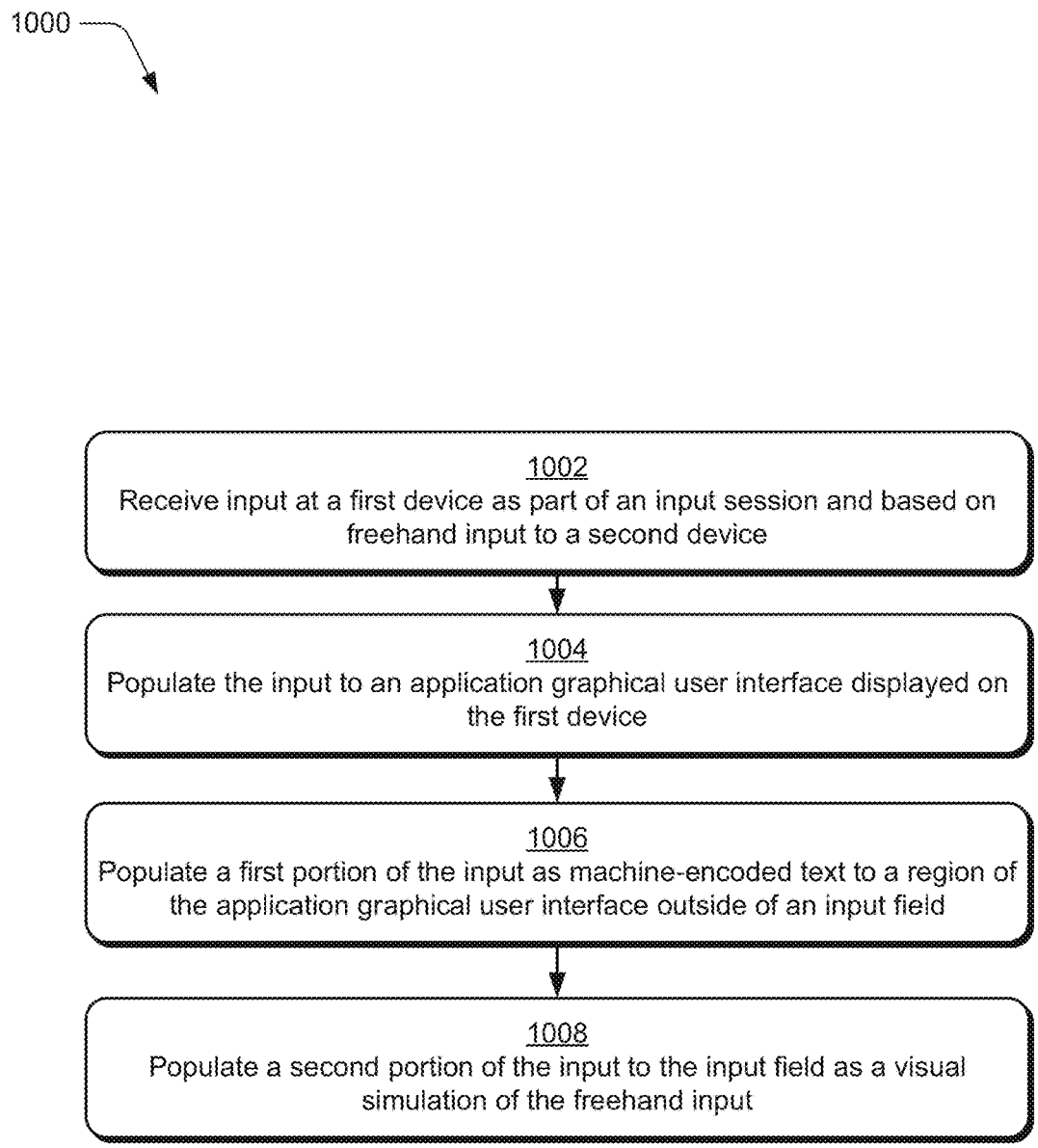
FIG. 10 illustrates an example method for enabling differential processing of proximity-based input in accordance with one or more implementations.

FIG. 10 illustrates an example method 1000 for enabling differential processing of proximity-based input in accordance with one or more implementations. The method 1000, for instance, occurs in conjunction with the method 900 for processing input communicated from the mobile device 102 to the computing device 104. At 1002 input is received at a first device as part of an input session and based on freehand input to a second device. For instance, proximity-based input to the mobile device 102 is communicated to the computing device 104 as part of an input session between the two devices. At 1004 the input is populated to an application graphical user interface displayed on the first device. A particular application GUI for an application 126, for example, is in focus on the computing device 104 and the input is populated to the application GUI.

At 1006 a first portion of the input is populated as machine-encoded characters to a region of the application graphical user interface outside of an input field. The application GUI, for instance, includes an input field in addition to visual regions outside of the input field. Accordingly, when input focus is applied to a region outside of the input field, freehand input received as part of the input session (e.g., freehand input to the mobile device 102) is converted into machine-encoded characters and populated to the region outside of the input field.

At 1008 a second portion of the input is populated to the input field as a visual simulation of the freehand input. For example, input focus is applied to the input field and thus input data based on the freehand input to the mobile device 102 is utilized to generate input that visually simulates the freehand input, and the input is populated to the input field. Thus, different portions of an application GUI are able to utilize input as part of an input session in different ways, such as for machine-encoded characters, visual simulation of freehand input, and so forth.

Accordingly, implementations of input session between devices based on an input trigger provide ways for enabling input sessions between devices to be automatically invoked and managed.

Figure 11:
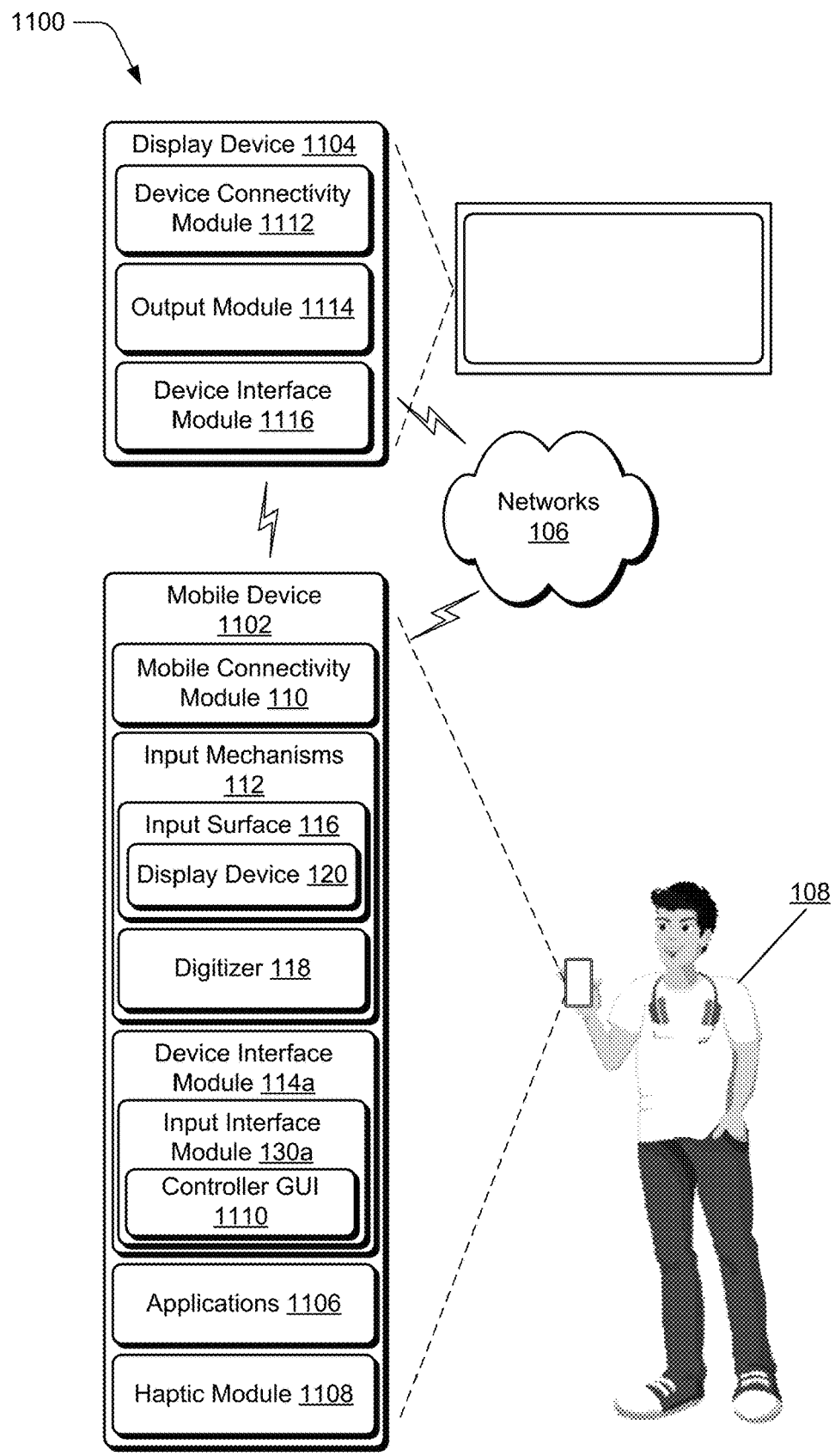
FIG. 11 illustrates an example environment in which aspects of controller mode for a mobile device can be implemented in accordance with one or more implementations.

FIG. 11 illustrates an example environment 1100 in which aspects of controller mode for a mobile device can be implemented. The environment 1100, for instance, represents a variation and/or extension of the environment 100. The environment 1100 includes a mobile device 1102 and a display device 1104 which are interconnectable to enable content from the mobile device 1102 to be displayed by the display device 1104. Various features and functionality of the mobile device 1102 are described above with reference to the mobile device 102 and in this particular implementation the mobile device 1102 includes applications 1106 and a haptic module 1108. The mobile device 1102, for instance, represents an implementation of the mobile device 102.

The applications 1106 represent functionality for performing different computing tasks via the mobile device 1102, such as gaming, media consumption (e.g., content streaming), productivity tasks (e.g., word processing, content generation, data analysis, etc.), web browsing, communication with other devices, and so forth. The haptic module 1108 represents functionality for enabling haptic output by the mobile device 1102 such as in conjunction with execution of a particular application 1106. The haptic module 1108, for instance, represents hardware and logic for haptic output by the mobile device 1102.

In this particular example the input interface module 130*a* includes functionality for generating a controller graphical user interface (GUI) 1110 which represents functionality for receiving user input to control functionality of instances of the applications 1106. As further detailed below, for instance, in response to various triggering events, the controller GUI 1110 is displayed on the display device 120 for receiving input to control functionality and/or execution of instances of the applications 1106.

The display device 1104 represents functionality for various types of content output, such as output of visual and audible content. The display device 1104 can be implemented in various ways, such as a television (e.g., a smart TV), a display panel, a projector display, a computing device with an associated display device (e.g., the computing device 104), and so forth. In at least one implementation the display device 1104 represents a dedicated display device configured to output visual content generated by other devices, such as content generated at the mobile device 1102 and transmitted to the display device 1104 for display.

Alternatively or additionally the display device 1104 includes computing functionality, such as the computing device 104.

The display device 1104 includes various functionality for enabling the display device 1104 to output content such as content received from the mobile device 1104, including a device connectivity module 1112, an output module 1114, and a device interface module 1116. The device connectivity module 1112 represents functionality (e.g., logic and hardware) for enabling the display device 1104 to interconnect with other devices and/or networks, such as the mobile device 1102 and the network 106. The device connectivity module 1112, for instance, enables wireless and/or wired connectivity of the display device 1104 such as for receiving content from other devices for display. In at least one implementation the device connectivity module 1112 connects to the network 106 (e.g., via wireless and/or wired connectivity) for intercommunication with other devices and/or networks. Alternatively or additionally the connectivity module 1112 enables direct device-to-device connectivity with other devices, such as the mobile device 1102. The mobile connectivity module 110 of the mobile device 1102 and the device connectivity module 1112 of the display device, for instance, are configured to communicate via a variety of different wireless protocols, such as Wireless Local Area Network (WLAN) (e.g., Wi-Fi), Wi-Fi Direct, wireless short distance communication (e.g., Bluetooth™ (including BLE), Near Field Communication (NFC)), and so forth.

The output module 1114 represents functionality for enabling content output by the display device 1104, such as visual content and audible content. The output module 1114, for instance, includes a display driver and/or other logic and hardware to outputting content by the display device 1104. The device interface module 1116 is representative of functionality for enabling the display device 1104 to interface with other devices. For instance, the device interface module 1116 interfaces with the device interface module 114a of the mobile device 1102 to enable collaborative data communication between the display device 1104 and the mobile device 1102. In at least one implementation the device interface module 1116 is optional to the display device 1104.

Figure 12:
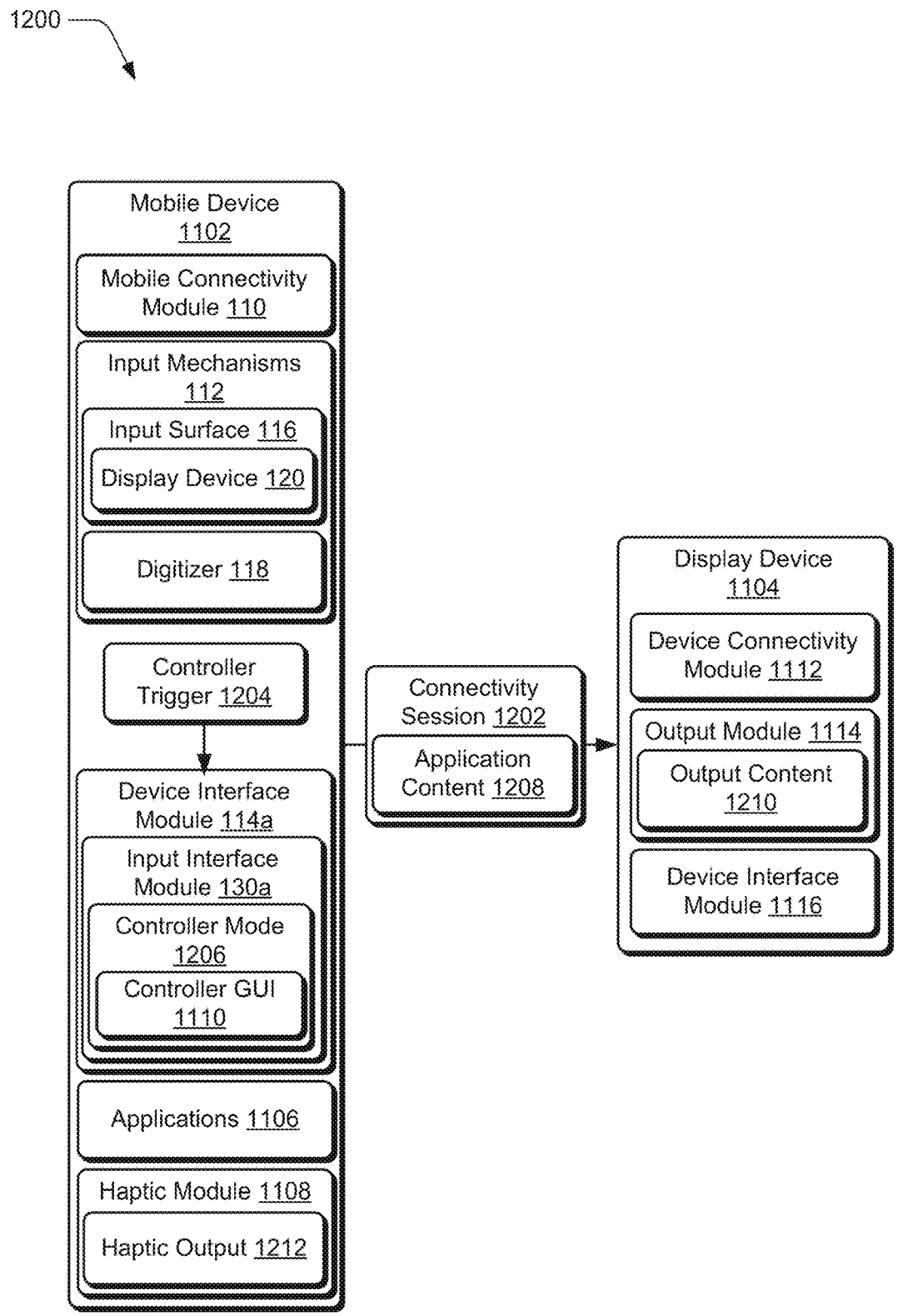
FIG. 12 depicts an example system for implementing techniques for controller mode for a mobile device in accordance with one or more implementations.

FIG. 12 depicts an example system 1200 for implementing techniques for controller mode for a mobile device in accordance with one or more implementations. Generally, the system 1200 can be implemented in the environment 1100 and/or the environment 100 and incorporates attributes of the environments 1100, 100 introduced above. In the system 1200 a connectivity session 1202 is established between the mobile device 1102 and the display device 1104. The connectivity session 1202, for instance, enables the mobile device 1102 to transmit content to the display device 1102 for output via wireless and/or wired connectivity. In at least one implementation the connectivity session 1202 is established via negotiation between the mobile connectivity module 110 and the device connectivity module 1112. Alternatively or additionally the connectivity session 1202 is established via communication between the device interface module 114a and the device interface module 1116.

Further to the system 1200 a controller trigger 1204 occurs indicating that the mobile device 1102 is to initiate a controller mode for providing input controller functionality on the mobile device 1102. In at least one implementation the controller trigger 1204 occurs in response to a launch of an application 1106 and/or initiation of the connectivity session 1202. Accordingly, in response to the controller trigger 1204 the input interface module 130a initiates a controller mode 1206 and causes display of the controller GUI 1110 on the display device 120. Further, application content 1208 for an application 1106 is communicated from the mobile device 1102 to the display device 1104 and is output as output content 1210 on the display device 1104 via the output module 1114. The application content 1208, for instance, represents an application GUI for an application 1106 that is launched on the mobile device 1102 and the application GUI is output on the display device 1104 as the output content 1210. As discussed in some of the examples below, a user leverages the controller GUI 1110 to interact with the application content 1208 such as to provide input to the application content 1208 and the user interactions are reflected in the output content 1210. Further, in at least some implementations, the haptic module 1108 causes the mobile device 1102 to output haptic output 1212 as part of a controller mode 1206, such as to provide tactile feedback within the controller GUI 1110.

Figure 13:
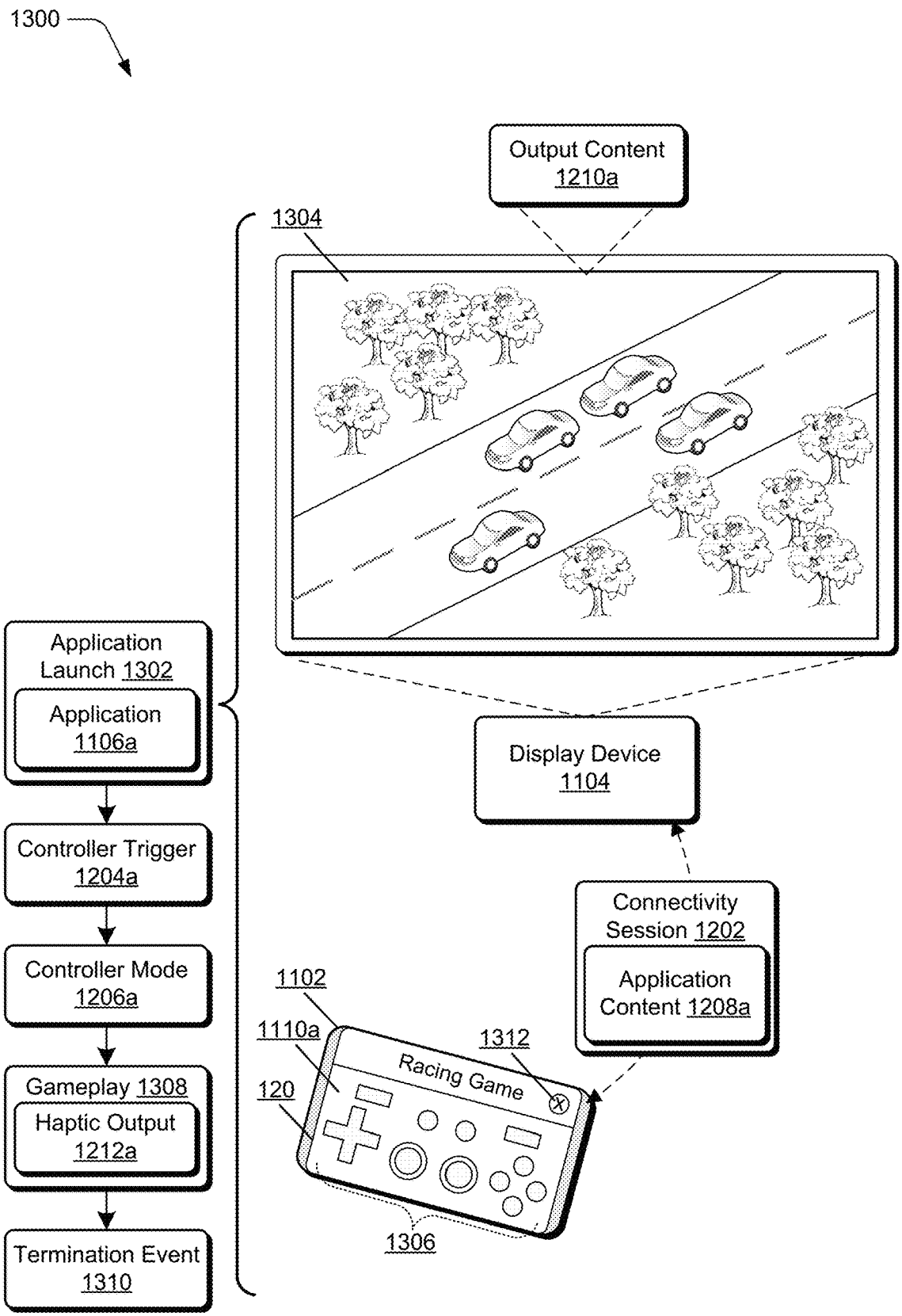
FIG. 13 depicts a scenario for implementing a controller mode in accordance with one or more implementations.

FIG. 13 depicts a scenario 1300 for implementing a controller mode in accordance with one or more implementations. In the scenario 1300 an application launch 1302 occurs indicating that an application 1106a is launched on the mobile device 1102. Further, a connectivity session 1202 is established between the mobile device 1102 and the display device 1104, and application content 1208a generated by the application 1106a is communicated from the mobile device 1102 to the display device 1104. The display device 1104 outputs the application content 1208a as output content 1210a.

Based on the application launch 1302 and/or the connectivity session 1202, a controller trigger 1204a is detected and the mobile device 1102 initiates a controller mode 1206a for enabling the mobile device 1102 to act as an input controller for controlling functionality of the application 1106a. The controller trigger 1204a, for example, occurs in response to the application launch 1302 and/or initiation of the connectivity session 1202. In this particular example the application 1106a represents a gaming application and the output content 1210a includes a game GUI 1304 generated by the application 1106a. The game GUI 1304, for example, includes controllable game features that are controllable as part of gameplay of the application 1106a. Accordingly, in the controller mode 1206a, a controller GUI 1110a is generated by the input interface module 130a and displayed on the display device 120. The controller GUI 1110a, for instance, includes game controls 1306 that are displayed within the controller GUI 1110a and that represent different selectable indicia configured to receive input (e.g., touch input) to control various aspects of gameplay of the application 1106a.

In at least one implementation the game controls 1306 are generated by the application 1106a and communicated to the input interface module 130a for presentation as part of the controller GUI 1110a. Alternatively the controller GUI 1110a including the game controls 1306 is generated by the application 1106a and communicated to the input interface module 130a for display on the display device 120. Accordingly, as part of gameplay 1308 for the application 1106a, a user interacts with the game controls 1306 to participate in the gameplay 1308, e.g., to manipulate controllable game features displayed in the game GUI 1304. In at least one implementation the gameplay 1308 includes haptic output 1212a generated by the haptic module 1108. The haptic output 1212a, for instance, is generated and output on the mobile device 1102 to provide haptic feedback for various gameplay-related actions that occur as part of the gameplay 1308.

Further to the scenario 1300 a termination event 1310 occurs that terminates the controller mode 1206a. Generally, the termination event 1310 occurs in response to various events such as a user selecting a close control 1312 presented on the controller GUI 1110a, a user closing the application 1106a, a power off event of the mobile device 1102 and/or the display device 1104, a disconnection of the mobile device 1102 from the display device 1104, and so forth. Accordingly, based on the termination event 1310, the controller mode 1206a is terminated and the controller GUI 1110a is removed from display on the mobile device 1102.

Figure 14:
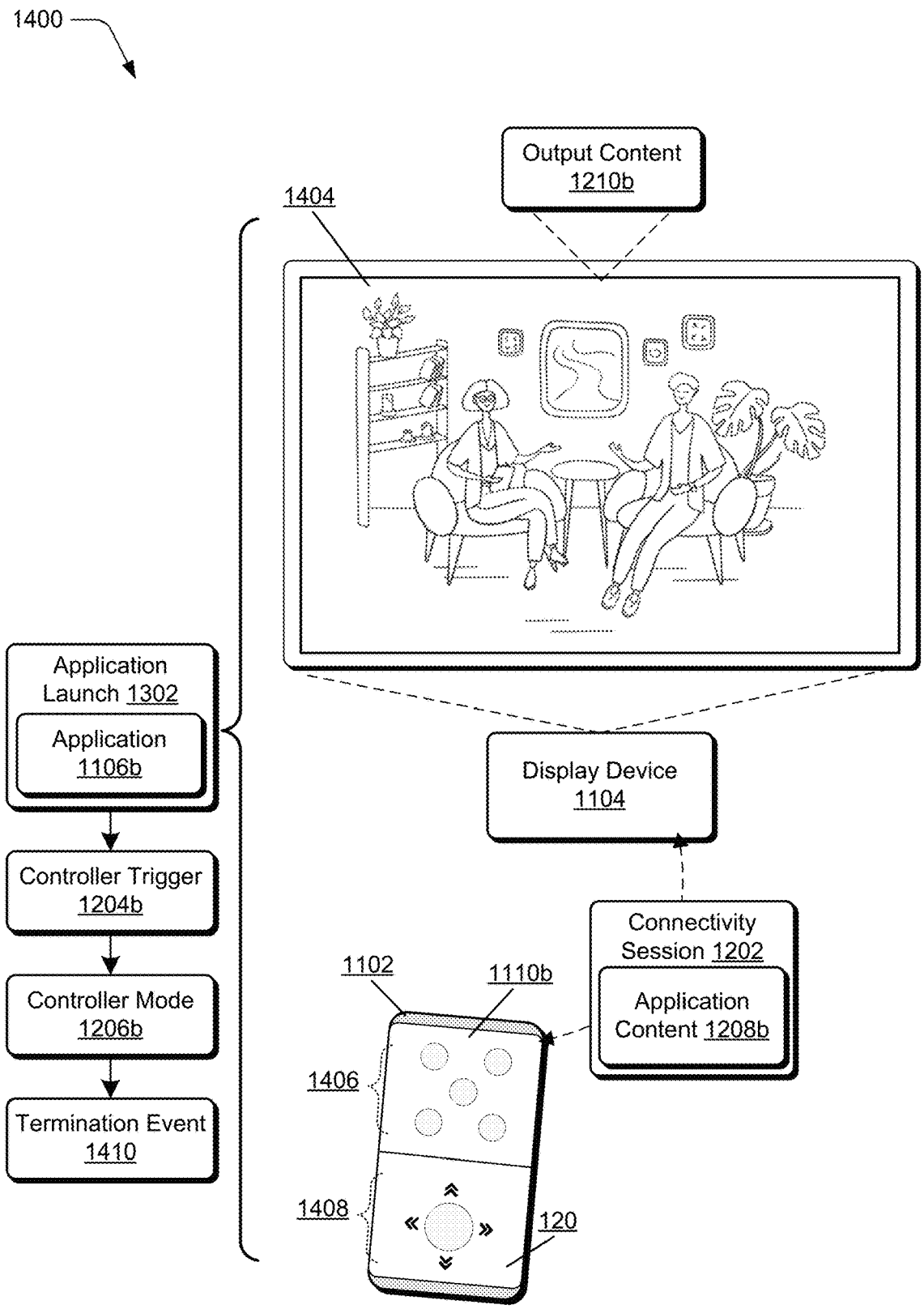
FIG. 14 depicts a scenario for implementing a controller mode in accordance with one or more implementations.

FIG. 14 depicts a scenario 1400 for implementing a controller mode in accordance with one or more implementations. In the scenario 1400 an application launch 1302 occurs indicating that an application 1106b is launched on the mobile device 1102. Further, a connectivity session 1202 is established between the mobile device 1102 and the display device 1104 and application content 1208b generated by the application 1106b is communicated from the mobile device 1102 to the display device 1104. The display device 1104 outputs the application content 1208b as output content 1210b.

Based on the application launch 1302 and/or the connectivity session 1202, a controller trigger 1204b is detected and the mobile device 1102 initiates a controller mode 1206b for enabling the mobile device 1102 to act as an input controller for controlling functionality of the application 1106b. The controller trigger 1204b, for example, occurs in response to the application launch 1302 and/or initiation of the connectivity session 1202. In this particular example the application 1106b represents a media player application and the output content 1210b includes a media player GUI 1404 generated by the application 1106a. The media player GUI 1404, for example, includes media content output via the application 1106a, such as movies, television content, education content, instructional content, and so forth. For instance, the application content 1208b includes media content retrieved from a network-based media content service and/or media content stored on the mobile device 1102.

Accordingly, in the controller mode 1206b, a controller GUI 1110b is generated by the input interface module 130a and displayed on the display device 120. The controller GUI 1110b, for instance, includes application controls 1406 and navigation controls 1408 that are displayed within the controller GUI 1110b and that represent different selectable indicia configured to receive input (e.g., touch input) to control various functionality of the application 1106b. For instance, the application controls 1406 are each selectable to access various functionality of the application 1106b, such as to navigate to a home screen, to return to a previous screen, to close the application 1106b, and so forth. The navigation controls 1408 are selectable to navigate within media content output within the media player GUI 1404, such as to play, pause, fast forward, rewind, and so forth.

In at least one implementation the application controls 1406 and the navigation controls 1408 are generated by the application 1106b and communicated to the input interface module 130a for presentation as part of the controller GUI 1110b. Alternatively the controller GUI 1110b including the application controls 1406 and the navigation controls 1408 is generated by the application 1106b and communicated to the input interface module 130a for display on the display device 120. Accordingly, as part of playback of the application content 1208b, a user is able to interact with the application controls 1406 and the navigation controls 1408 to access functionality of the application content 1208b and to navigate within the application content 1208b.

Further to the scenario 1400 a termination event 1410 occurs that terminates the controller mode 1206b. Generally, the termination event 1410 occurs in response to various events such as a user selecting an application control 1406, a user closing the application 1106b, a power off event of the mobile device 1102 and/or the display device 1104, a disconnection of the mobile device 1102 from the display device 1104, and so forth. Accordingly, based on the termination event 1410, the controller mode 1206b is terminated and the controller GUI 1110b is removed from display on the mobile device 1102.

Figure 15:
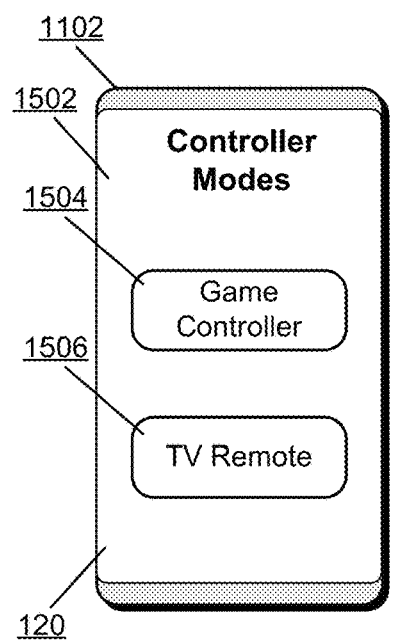
FIG. 15 depicts a scenario for accessing different controller modes in accordance with one or more implementations.

FIG. 15 depicts a scenario 1500 for accessing different controller modes in accordance with one or more implementations. In the scenario 1500 a controller mode GUI 1502 is displayed on the display device 120 of the mobile device 1102. The controller mode GUI 1502, for instance, is generated and presented by the input interface module 130a and enables a user to access different controller modes. Accordingly, the controller mode GUI 1502 includes a game control 1504 and a TV control 1506. The game control 1504 is selectable to enter a game controller mode and to present a game controller as part of a controller GUI 1110. For instance, selecting the game control 1504 causes the input interface module 130a to present the controller GUI 1110a for use in participating in gameplay of a game application such as the application 1106a. Selecting the game control 1504, for example, represents a further example of a controller trigger 1204a discussed with reference to the scenario 1300. In at least one implementation the controller GUI 1110a is automatically adaptable by the input interface module 130a for use in participating in gameplay of a variety of different game applications.

The TV control 1506 is selectable to enter a TV controller mode and to present a media content controller as part of a controller GUI 1110. For instance, selecting the TV controller 1506 causes the input interface module 130a to present the controller GUI 1110b for use in accessing and navigating through media content such as presented by the application 1106b. Selecting the TV control 1506, for example, represents a further example of a controller trigger 1204b discussed with reference to the scenario 1400. In at least one implementation the controller GUI 1110b is automatically adaptable by the input interface module 130a for use in participating for accessing and navigating media content presented by different instances of media content applications and/or media services. Thus, such as described in the example scenarios 1300-1500, a variety of different controller triggers 1204 are available to implement different controller modes 1206.

Figure 16:
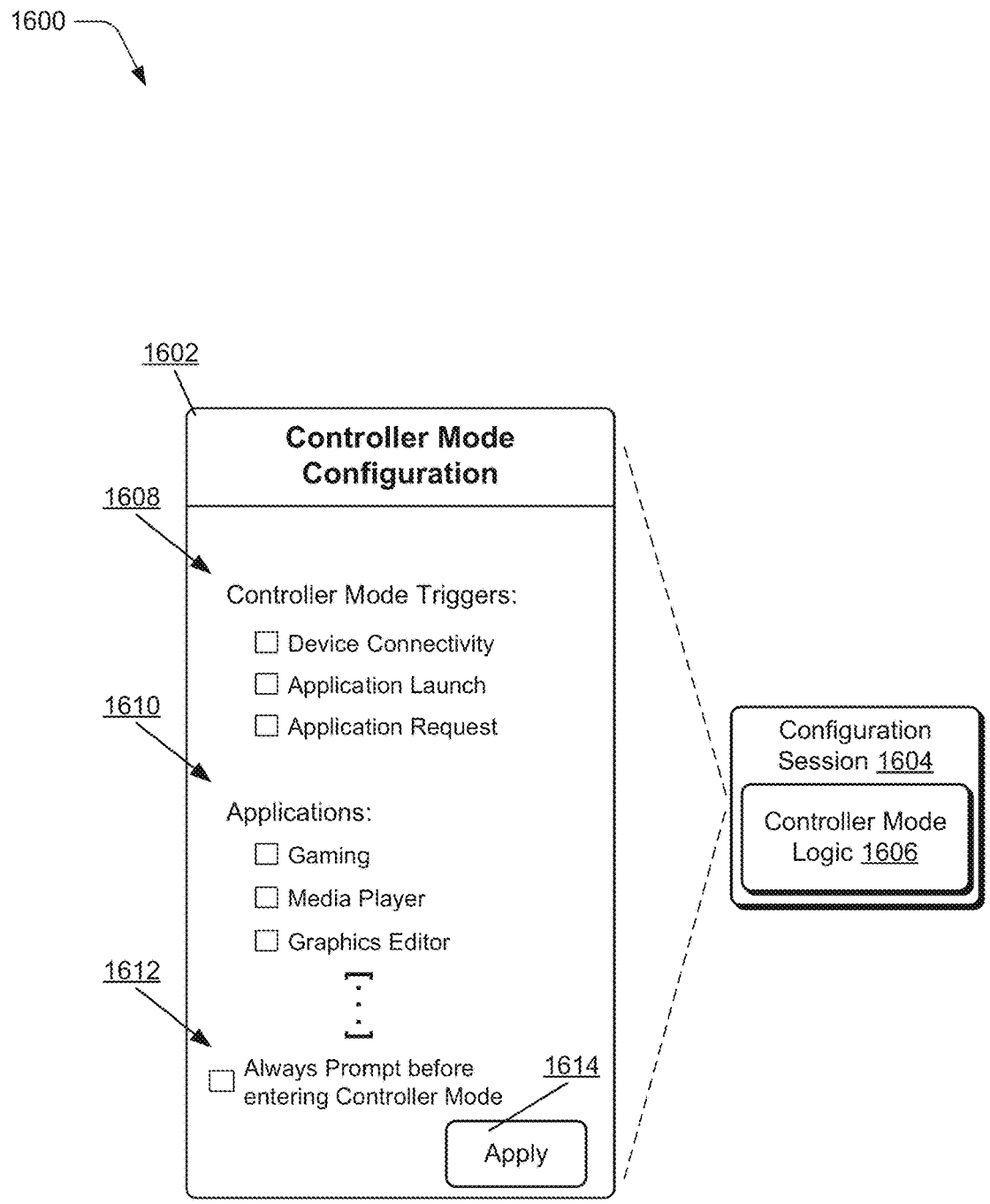
FIG. 16 depicts a scenario for configuring control mode logic for a controller mode in accordance with one or more implementations.

FIG. 16 depicts a scenario 1600 for configuring control mode logic for a controller mode in accordance with one or more implementations. In the scenario 1600 a configuration GUI 1602 is presented as part of a configuration session 1604 for configuring input mode logic 1606, such as by the input interface module 130a. The configuration GUI 1602 includes a trigger field 1608, an applications field 1610 and a prompt field 1612. The trigger field 1608 enables selection of different trigger events that cause the mobile device 102 to enter a controller mode. For instance, "Device Connectivity" represents an event where the mobile device 1102 connects to a different device for content output (e.g., the display device 1104), such as via wireless and/or wired connectivity. One example of Device Connectivity is a connectivity session 1202 such as described above. "Application Launch" represents a launch of an application on the mobile device 1102. "Application Request" represents an event where an application on the mobile device 1102 requests that a controller GUI 1110 be presented on the mobile device 1102, e.g., that a controller mode 1206 be initiated. For instance, certain instances of the applications 1106 include logic to request a controller mode 1206, such as when application functionality is presented that is able to receive input via a controller GUI 1110 presented on the mobile device.

The applications field 1610 lists different types and/or instances of applications 1106 that are selectable to identify an application launch for a controller mode trigger event. For instance, in conjunction with selecting "Application Launch" from the trigger field 1608 a user selects an application or set of applications from the applications field 1610 to be utilized as a trigger event for a controller mode when an identified application is launched. Alternatively or additionally, in conjunction with selecting "Application Request" from the trigger field 1608 a user selects an application or set of applications from the applications field 1610 to be utilized as a trigger event for a controller mode when an identified application requests a controller GUI and/or a controller mode.

The prompt field 1612 is selectable to enable or disable a user prompt before a device enters a controller mode. For instance, if the prompt field 1612 is selected and enabled and a controller trigger event occurs, a user prompt is presented in conjunction with and/or before transitioning to a controller mode. However, if the prompt field 1612 is not selected and enabled, an automatic transition to a controller mode occurs in response to a trigger event, e.g., without a user prompt. The configuration GUI 1602 also includes an apply control 1614 that is selectable to apply the configuration settings from the configuration GUI 1602, e.g., to the controller mode logic 1606 utilized by the input interface module 130*a*.

Figure 17:
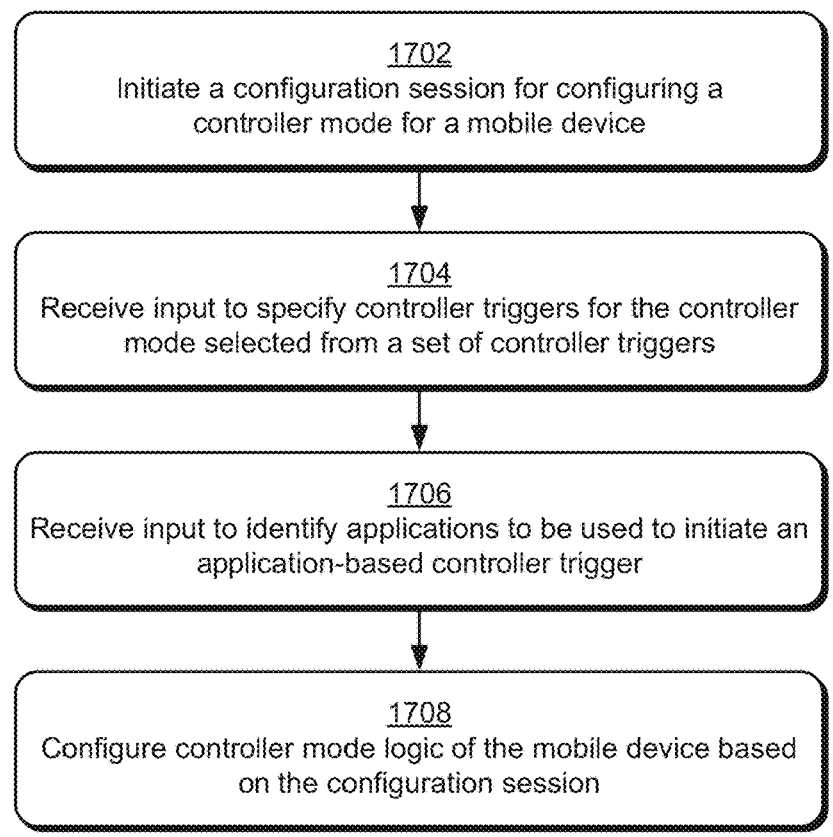
FIG. 17 illustrates an example method for configuring controller mode logic for a controller mode in accordance with one or more implementations.

FIG. 17 illustrates an example method 1700 for configuring controller mode logic for a controller mode in accordance with one or more implementations. At 1702 a configuration session is initiated for configuring a controller mode for a mobile device. Generally, the controller mode enables a mobile device to implement a controller graphical user interface for interacting with content generated at the mobile device and communicated to a remote display device.

At 1704 input is received to specify controller triggers for the controller mode selected from a set of controller triggers. As part of the configuration session, for instance, the input interface module 130*a* presents the configuration GUI 1602 which enables different aspects of a controller mode to be configured, such as controller triggers for triggering a controller mode. Generally, a variety of different controller triggers are available to trigger a controller mode such as an application launch event on the mobile device, a connectivity event between the mobile device and a remote display device, a request from an application for a controller mode, and so forth.

At 1706 input is received to identify applications to be used to initiate an application-based controller trigger. As part of the configuration session, for instance, a user provides input to the configuration GUI 1602 to identify a set of applications to be utilized to initiate an application-based controller trigger, such as based on an application launch event and/or an application request event. In at least one implementation, as part of the configuration session, a user provides input to specify whether a controller mode prompt is to be presented in conjunction with transitioning the mobile device to a controller mode.

At 1708 controller mode logic of the mobile device is configured based on the configuration session. The controller mode logic, for instance, enables interaction with content generated on the mobile device via a controller graphical user interface according to the controller mode logic, and the content to be communicated to the remote display device for output.

Figure 18:
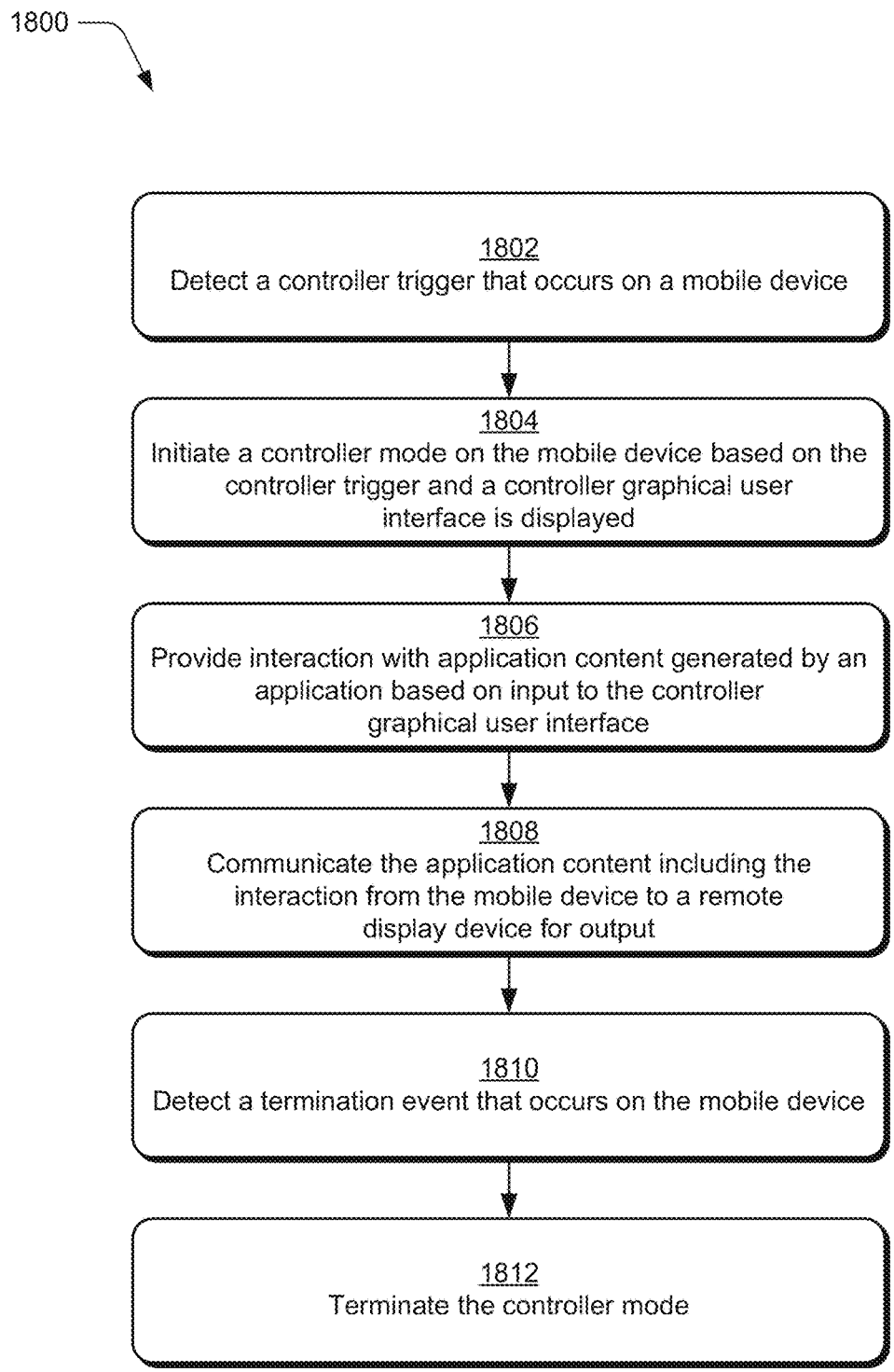
FIG. 18 illustrates an example method for implementing a controller mode in accordance with one or more implementations.

FIG. 18 illustrates an example method 1800 for implementing a controller mode in accordance with one or more implementations. At 1802 a controller trigger is detected that occurs on a mobile device. Examples of different controller triggers are discussed in detail above, such as an application launch on the mobile device, user input to initiate a controller mode on the mobile device, initiation of content connectivity between the mobile device and a remote display device, an application request for a controller mode, and so forth. In a scenario where user input is received to initiate the controller mode, the user input selects the controller mode from a controller mode graphical user interface, such as the controller mode GUI 1502.

At 1804 a controller mode on the mobile device is initiated based on the controller trigger and a controller graphical user interface is displayed. In at least one implementation the controller trigger and initiation of the controller mode occurs automatically and independent of user input to initiate the controller mode. Alternatively a user provides input to request initiation of the controller mode. As part of initiating the controller mode a controller graphical user interface is presented on the mobile device.

At 1806 input to the controller graphical user interface provides interaction with application content generated by an application. For instance, an application executing on the mobile device generates and/or outputs content and a user provides input to the controller graphical user interface to interact with the content, such as to manipulate the content, select content for output, navigate through the content, and so forth. At 1808 the application content including the interaction is communicated from the mobile device to a remote display device for output. The mobile device, for instance, manipulates the application content based on the input interaction and communicates the application content as manipulated by the input interaction to the remote display device for output. In at least one implementation the application content is generated and manipulated at the mobile device while the controller graphical user interface is displayed on the mobile device, and the application content is not displayed on the mobile device but is displayed on the remote display device while the controller graphical user interface is displayed on the mobile device.

At 1810 a termination event is detected that occurs on the mobile device. Generally, different termination events can terminate a controller mode, such as a user providing input to terminate the controller mode, the application being closed, the mobile device being disconnected from the remote display device, and so forth. At 1812 the controller mode is terminated. For instance, in response to the termination event, the controller session is terminated and the controller graphical user interface is removed from display on the mobile device.

According to various implementations the systems and techniques described herein are interchangeable such as to provide implementations that transition between and combine input sessions based on input triggers and controller modes based on controller triggers. For instance, a particular mobile device (e.g., the mobile device 102 and/or the mobile device 1102) is able to include functionality for implementing both input sessions based on input triggers and controller modes based on controller triggers, and to transition between input sessions and input modes based on different events. Consider, for example, the following example method.

Figure 19:
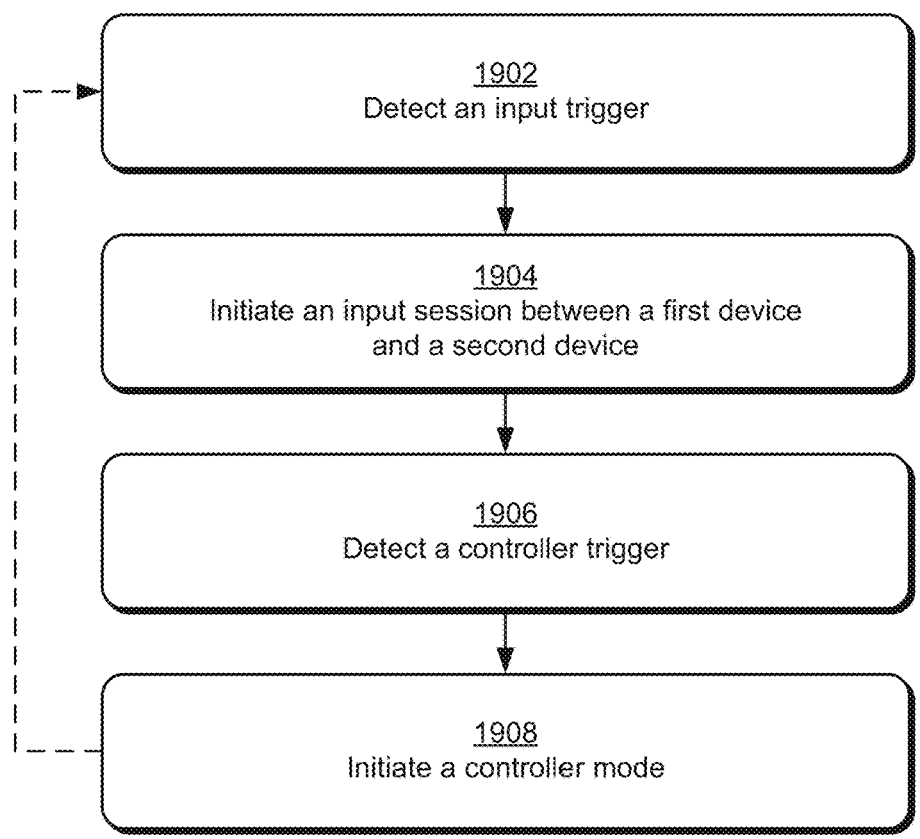
FIG. 19 illustrates an example method for transitioning between device states in accordance with one or more implementations.

FIG. 19 illustrates an example method 1900 for transitioning between device states in accordance with one or more implementations. At 1902 an input trigger is detected. The input trigger, for instance, occurs on the computing device 104. Alternatively the input trigger occurs on an instance of the mobile devices 102, 1102. Examples of different input triggers are detailed above. At 1904 an input session is initiated between a first device and a second device. The input session, for instance, is established between the computing device 104 and an instance of the mobile devices 102, 1102. As described above, the input session includes presenting an input graphical user interface on the second device to enable proximity-based input to the second device to be communicated to the first device and utilized for various purposes, such as to populate an application GUI displayed on the first device. The application GUI, for instance, is generated by an application executing on the computing device 104 and displayed on the computing device 104. Alternatively the application GUI is generated by an application executing on an instance of the mobile devices 102, 1102 and is communicated for display on the second device, e.g., the computing device 104 or the display device 1104. Different attributes and variations of input sessions are detailed above.

At 1906 a controller trigger is detected. The controller trigger, for instance, occurs at the computing device 104 or an instance of the mobile devices 102, 1102. Examples of different controller triggers are detailed above. In at least one implementation the controller trigger occurs while the input session is active. For instance, while an input session for a particular application is active, a different application is launched that represents a controller trigger. The different application, for example, is launched on an instance of the mobile devices 102, 1102, or the computing device 104.

Alternatively or additionally to occurring in response to an application launch, the controller trigger is initiated based on an event generated by an executing application, such as change in input type utilized by an application. For instance, consider a scenario where a particular application is executing and utilizing input as part of an input session, such as described above. A change in input focus then occurs in the application such that the application is able to utilize input as part of a controller mode, e.g., input generated via interaction with a controller GUI. Accordingly, the change in input focus represents a controller trigger that can cause a transition from an input session to a controller mode. Alternatively the controller trigger occurs after the input session is terminated.

At 1908 a controller mode is initiated. For instance, in response to the controller trigger, a controller mode is activated on an instance of the mobile devices 102, 1102. In the controller mode, for example, a controller GUI is presented on a mobile device 102, 1102 and utilized to provide input for an application GUI, such as for an application GUI generated on the mobile device 102, 1102 and communicated to the remote display device 1104 for output, or an application GUI generated on the computing device 104 for an application executing on the computing device 104. In at least one implementation the computing device 104 can be implemented as a remote display device for a mobile device 102, 1102, e.g., an instance of the remote display device 1104.

Generally, the method 1900 can be implemented to transition back and forth between input sessions and controller modes, such as detecting input triggers and controller triggers that occur on a particular device and/or via interaction between a set of devices. Further, a termination event can occur such that an input session and/or a controller mode is terminated. Accordingly, the various techniques described herein are interchangeable to provide input session and controller mode functionality and to enable interaction between such functionality.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 20:
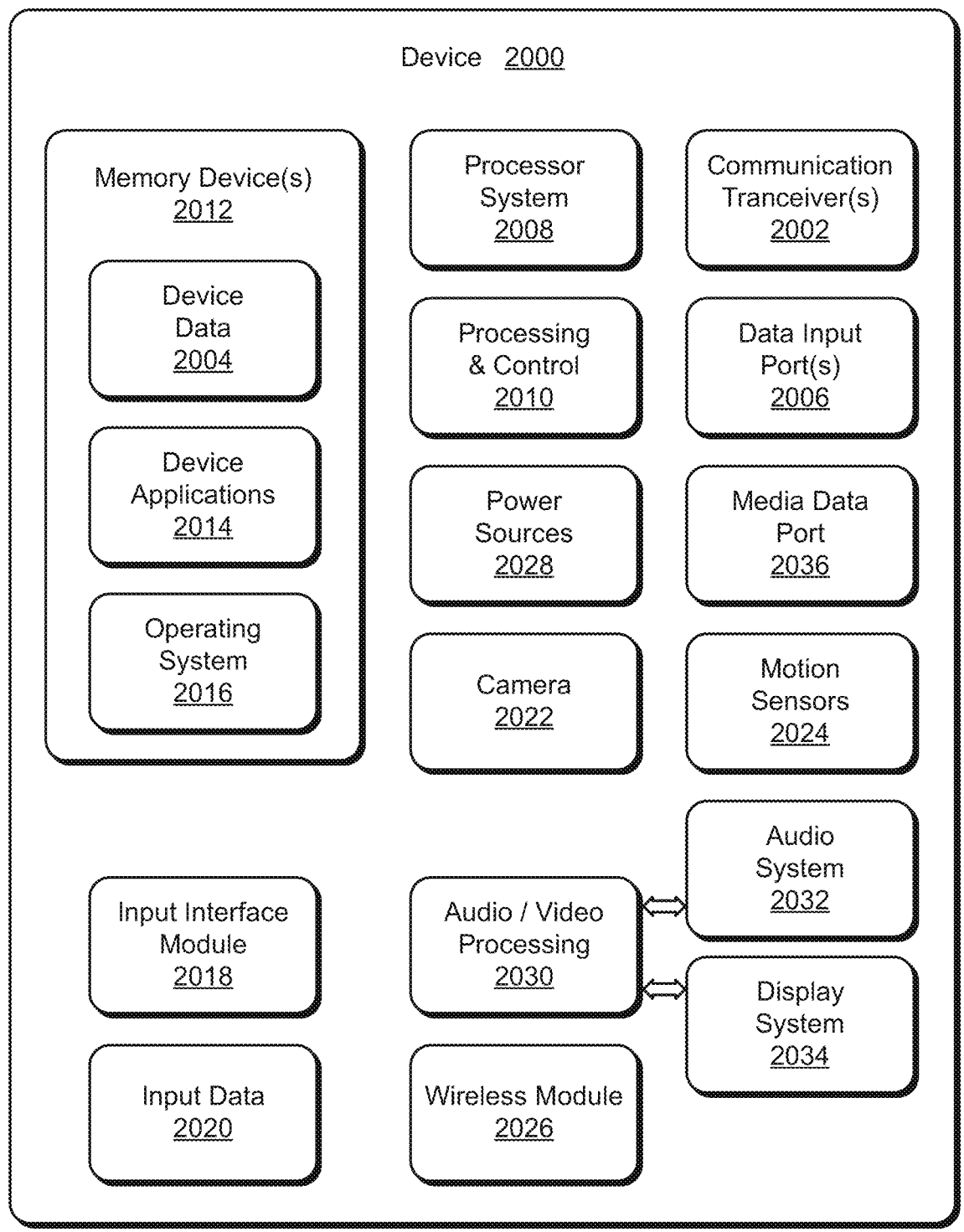
FIG. 20 illustrates various components of an example device that can implement aspects of input session between devices based on an input trigger and controller mode for a mobile device.

FIG. 20 illustrates various components of an example device 2000 in which aspects of input session between devices based on an input trigger and controller mode for a mobile device can be implemented. The example device 2000 can be implemented as any of the devices described with reference to the previous FIGS. 1-19, such as any type of mobile device, mobile phone, mobile device, wearable device, tablet, computing, communication, entertainment, gaming, media playback, and/or other type of electronic device. For example, the mobile device 102, the computing device 104, and/or the mobile device 1102 as shown and described with reference to FIGS. 1-19 may be implemented as the example device 2000. In a wearable device implementation, the device may include any one or combination of a watch, armband, wristband, bracelet, glove or pair of gloves, glasses, jewelry items, clothing items, any type of footwear or headwear, and/or other types of wearables.

The device 2000 includes communication transceivers 2002 that enable wired and/or wireless communication of device data 2004 with other devices. The device data 2004 can include any of device identifying data, device location data, wireless connectivity data, and wireless protocol data. Additionally, the device data 2004 can include any type of audio, video, and/or image data. Example communication transceivers 2002 include wireless personal area network (WPAN) radios compliant with various IEEE 2002.15 (Bluetooth™) standards, wireless local area network (WLAN) radios compliant with any of the various IEEE 2002.11 (Wi-Fi™) standards, wireless wide area network (WWAN) radios for cellular phone communication, wireless metropolitan area network (WMAN) radios compliant with various IEEE 2002.16 (WiMAX™) standards, and wired local area network (LAN) Ethernet transceivers for network data communication.

The device 2000 may also include one or more data input ports 2006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 2000 includes a processing system 2008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 2010. The device 2000 may further include any type of a system bus or other data and command transfer system that couples the various components within the device. A system bus can include any one or combination of different bus structures and architectures, as well as control and data lines.

The device 2000 also includes computer-readable storage memory 2012 (e.g., memory devices) that enable data storage, such as data storage devices that can be accessed by a computing device, and that provide persistent storage of data and executable instructions (e.g., software applications, programs, functions, and the like). Examples of the computer-readable storage memory 2012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 2000 may also include a mass storage media device.

The computer-readable storage memory 2012 provides data storage mechanisms to store the device data 2004, other types of information and/or data, and various device applications 2014 (e.g., software applications). For example, an operating system 2016 can be maintained as software instructions with a memory device and executed by the processing system 2008. The device applications may also include a device manager, such as any form of a control application, software application, signal-processing and control module, code that is native to a particular device, a hardware abstraction layer for a particular device, and so on. Computer-readable storage memory 2012 represents media and/or devices that enable persistent and/or non-transitory storage of information in contrast to mere signal transmission, carrier waves, or signals per se. Computer-readable storage memory 2012 do not include signals per se or transitory signals.

In this example, the device 2000 includes an input interface module 2018 that implements aspects of input session between devices based on an input trigger and controller mode for a mobile device and may be implemented with hardware components and/or in software as one of the device applications 2014. An example, the input interface module 2018 can be implemented as the input interface module 130a and/or the input interface module 130b described in detail above. In implementations, the input interface module 2018 may include independent processing, memory, and logic components as a computing and/or electronic device integrated with the device 2000. The device 2000 also includes input data 2020 for implementing aspects of input session between devices based on an input trigger and controller mode for a mobile device, and may include data from the input interface module 2018.

In this example, the example device 2000 also includes a camera 2022 and motion sensors 2024, such as may be implemented in an inertial measurement unit (IMU). The motion sensors 2024 can be implemented with various sensors, such as a gyroscope, an accelerometer, and/or other types of motion sensors to sense motion of the device. The various motion sensors 2024 may also be implemented as components of an inertial measurement unit in the device.

The device 2000 also includes a wireless module 2026, which is representative of functionality to perform various wireless communication tasks. For instance, for the mobile devices 102, 1102 and/or the computing device 104, the wireless module 2026 can be leveraged to scan for and detect wireless networks, as well as negotiate wireless connectivity to wireless networks for the mobile devices 102, 1102 and/or the computing device 104. The device 2000 can also include one or more power sources 2028, such as when the device is implemented as a mobile device. The power sources 2028 may include a charging and/or power system, and can be implemented as a flexible strip battery, a rechargeable battery, a charged super-capacitor, and/or any other type of active or passive power source.

The device 2000 also includes an audio and/or video processing system 2030 that generates audio data for an audio system 2032 and/or generates display data for a display system 2034. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 2036. In implementations, the audio system and/or the display system are integrated components of the example device. Alternatively, the audio system and/or the display system are external, peripheral components to the example device.

Although implementations of input session between devices based on an input trigger and controller mode for a mobile device have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, including: detecting that a controller trigger occurs on a mobile device based on one or more of that an application is launched on the mobile device, user input to initiate a controller mode on the mobile device, or initiation of content connectivity between the mobile device and a remote display device; causing, automatically and in response to detecting the controller trigger, initiation of the controller mode on the mobile device and a controller graphical user interface to be presented on the mobile device; and causing proximity-based input to the controller graphical user interface to provide interaction with application content generated by the application and the application content to be communicated from the mobile device to the remote display device for output.

In addition to the previously described methods, any one or more of the following: further including displaying, on the mobile device, a controller mode graphical user interface that includes multiple different available controller modes for the mobile device, and wherein the user input to initiate the controller mode includes user input to select the controller mode from the controller mode graphical user interface; wherein the controller trigger includes an indication that a game application is launched on the mobile device, the controller graphical user interface includes a game control graphical user interface, and application content includes game content generated by the game application and communicated from the mobile device to the remote display device for output; further including causing haptic output on the mobile device as part of output of the game controller graphical user interface; wherein the controller trigger includes an indication that a media player application is launched on the mobile device, the controller graphical user interface includes a media player control graphical user interface, and application content includes media content generated by the media player application and communicated from the mobile device to the remote display device for output; wherein the controller trigger occurs automatically and independent of user input to initiate the controller mode; wherein the application content is not displayed on the mobile device while the controller graphical user interface is displayed on the mobile device; further including: initiating a configuration session for configuring the controller trigger, the configuration session including selectable controller trigger options for the controller trigger, the selectable trigger options including an application launch event and a remote display connectivity event; receiving selection of one or more of the controller trigger options as part of the configuration session; and configuring, based on the selection of the one or more of the controller trigger options, controller mode logic of the mobile device.

A system including: one or more processors; and one or more computer-readable storage media storing instructions that are executable by the one or more processors to: detect that a controller trigger occurs on a mobile device; cause, automatically and in response to the controller trigger, initiation of a controller mode on the mobile device and a controller graphical user interface to be presented on the mobile device; cause input to the controller graphical user interface to provide interaction with application content generated by the application; and cause the application content including the interaction to be communicated from the mobile device to the remote display device for output while the controller graphical user interface is displayed on the mobile device.

In addition to the previously described systems, any one or more of the following: wherein the instructions are further executable by the one or more processors to display, on the mobile device, a controller mode graphical user interface that includes multiple different available controller modes for the mobile device, and wherein the controller trigger includes user input to select the controller mode from the controller mode graphical user interface; wherein the controller trigger includes an indication that a game application is launched on the mobile device, the controller graphical user interface includes a game control graphical user interface, and application content includes game content generated by the game application and communicated from the mobile device to the remote display device for output; wherein the instructions are further executable by the one or more processors to cause haptic output on the mobile device in conjunction with output of the game controller graphical user interface; wherein the controller trigger includes an indication that a media player application is launched on the mobile device, the controller graphical user interface includes a media player control graphical user interface, and application content includes media content generated by the media player application and communicated from the mobile device to the remote display device for output; wherein the controller trigger is based on content connectivity between the mobile device and the remote display device; wherein the instructions are executable by the one or more processors to detect the controller trigger automatically and independent of user input to initiate the controller mode; wherein the instructions are further executable by the one or more processors to: detect that a termination event occurs based on one or more of that the application is closed or that the mobile device is disconnected from the remote display device; and cause, in response to the termination event, the controller mode to be terminated and the controller graphical user interface to be removed from display on the mobile device.

A method, including: initiating a configuration session for configuring a controller mode for enabling a mobile device to implement a controller graphical user interface for interacting with content generated at the mobile device and communicated to a remote display device; receiving, as part of the configuration session, input to specify one or more controller triggers selected from a set of controller triggers, the set of controller triggers including an application launch event on the mobile device and a connectivity event between the mobile device and the remote display device; and configuring, based on the configuration session, controller mode logic of the mobile device to enable interaction with content generated on the mobile device via the controller graphical user interface according to the controller mode logic and the content to be communicated to the remote display device for output.

In addition to the previously described methods, any one or more of the following: further including: receiving, as part of the configuration session, input to identify one or more applications to be used to initiate the application launch event for a controller trigger; and configuring the controller mode logic based on the identified one or more applications; further including: receiving, as part of the configuration session, further input to specify whether a controller mode prompt is to be presented in conjunction with transitioning the mobile device to a controller mode; and configuring the controller mode logic based on the further input; further including: detecting, subsequently to the configuration session, an indication that one or more of the specified controller triggers occurs on the mobile device;

and initiating, in response to the detected one or more controller triggers, a controller mode on the mobile device and according to the controller mode logic.

The invention claimed is:

1. A method, comprising:
displaying, on a mobile device, a controller mode graphical user interface that includes selections for multiple different available controller modes for the mobile device;
detecting that a controller trigger occurs on the mobile device, the controller trigger based on user input to select a controller mode from the multiple different available controller modes and on an application being launched on the mobile device;
causing, automatically and in response to detecting the controller trigger, initiation of the selected controller mode on the mobile device and a controller graphical user interface to be presented on the mobile device; and
causing proximity-based input to the controller graphical user interface to provide interaction with application content generated by the application and the application content to be communicated from the mobile device to a remote display device for output.

2. The method of claim 1, wherein the controller trigger comprises an indication that a game application is launched on the mobile device, the controller graphical user interface comprises a game control graphical user interface, and application content comprises game content generated by the game application and communicated from the mobile device to the remote display device for output.

3. The method of claim 2, further comprising causing haptic output on the mobile device as part of output of the game controller graphical user interface.

4. The method of claim 1, wherein the controller trigger comprises an indication that a media player application is launched on the mobile device, the controller graphical user interface comprises a media player control graphical user interface, and application content comprises media content generated by the media player application and communicated from the mobile device to the remote display device for output.

5. The method of claim 1, wherein the controller trigger occurs automatically and independent of user input to initiate the controller mode.

6. The method of claim 1, wherein the application content is not displayed on the mobile device while the controller graphical user interface is displayed on the mobile device.

7. The method of claim 1, further comprising:
initiating a configuration session for configuring the controller trigger, the configuration session including selectable controller trigger options for the controller trigger, the selectable trigger options including an application launch event and a remote display connectivity event;
receiving selection of one or more of the controller trigger options as part of the configuration session; and
configuring, based on the selection of the one or more of the controller trigger options, controller mode logic of the mobile device.

8. A system comprising:
one or more processors; and
one or more computer-readable storage media storing instructions that are executable by the one or more processors to:
display, on a mobile device and responsive to a launch of an application on the mobile device, a controller mode graphical user interface that includes a plurality of different available controller modes for the mobile device;
detect that a controller trigger occurs on the mobile device, the controller trigger comprising user input to select a controller mode from the plurality of different available controller modes;
cause, automatically and in response to the controller trigger, initiation of the selected controller mode on the mobile device and a controller graphical user interface to be presented on the mobile device;
cause input to the controller graphical user interface to provide interaction with application content generated by the application; and
cause the application content including the interaction to be communicated from the mobile device to a remote display device for output while the controller graphical user interface is displayed on the mobile device.

9. The method of claim 1, wherein the selected controller mode is a game control and wherein the controller graphical user interface is automatically adaptable based on a particular game application.

10. The method of claim 4, wherein the media player control graphical user interface includes application controls that are selectable to control one or more functionalities of the media player application and further includes navigation controls that represent selectable indicia to navigate within media content output by the media player application.

11. The system of claim 8, wherein the selected controller mode is a TV control and wherein the controller graphical user interface is automatically adaptable based on a particular media content application.

12. The system of claim 8, wherein the controller trigger further comprises an indication that a game application is launched on the mobile device, the controller graphical user interface comprises a game control graphical user interface, and application content comprises game content generated by the game application and communicated from the mobile device to the remote display device for output.

13. The system of claim 12, wherein the instructions are further executable by the one or more processors to cause haptic output on the mobile device in conjunction with output of the game controller graphical user interface.

14. The system of claim 8, wherein the controller trigger further comprises an indication that a media player application is launched on the mobile device, the controller graphical user interface comprises a media player control graphical user interface, and application content comprises media content generated by the media player application and communicated from the mobile device to the remote display device for output.

15. The system of claim 8, wherein the controller trigger is based on content connectivity between the mobile device and the remote display device.

16. The system of claim 8, wherein the instructions are executable by the one or more processors to detect the controller trigger automatically and independent of user input to initiate the controller mode.

17. The system of claim 8, wherein the instructions are further executable by the one or more processors to:
detect that a termination event occurs based on a detection that the application is closed; and
cause, in response to the termination event, the controller mode to be terminated and the controller graphical user interface to be removed from display on the mobile device.

18. A method, comprising:
initiating a configuration session that includes display of a configuration graphical user interface to receive input to specify configuration settings for configuring a controller mode for enabling a mobile device to implement a controller graphical user interface for interacting with content generated at the mobile device and communicated to a remote display device;
receiving, as part of the configuration session via the configuration graphical user interface, input to specify configuration settings including one or more controller triggers selected from a set of controller triggers, the set of controller triggers including an application launch event on the mobile device and a connectivity event between the mobile device and the remote display device;
receiving, as part of the configuration session via the configuration graphical user interface, further input to specify configuration settings including whether a controller mode prompt is to be presented in conjunction with transitioning the mobile device to a controller mode; and
configuring, based on the configuration session and responsive to a selection to apply the configuration settings in the configuration graphical user interface, controller mode logic of the mobile device to enable interaction with content generated on the mobile device via the controller graphical user interface according to the controller mode logic and the content to be communicated to the remote display device for output.

19. The method of claim 18, further comprising:
receiving, as part of the configuration session, input to identify one or more applications to be used to initiate the application launch event for a controller trigger; and
configuring the controller mode logic based on the identified one or more applications.

20. The method of claim 18, further comprising:
detecting, subsequently to the configuration session, an indication that one or more of the specified controller triggers occurs on the mobile device; and
initiating, in response to the detected one or more controller triggers, a controller mode on the mobile device and according to the controller mode logic.

\* \* \* \* \*